US010294686B1

(12) United States Patent
Erlich et al.

(10) Patent No.: US 10,294,686 B1
(45) Date of Patent: May 21, 2019

(54) RECHARGEABLE ROBOTIC POOL CLEANING APPARATUS

(71) Applicant: Water Tech, LLC, East Brunswick, NJ (US)

(72) Inventors: Guy Erlich, Monroe Township, NJ (US); John Many, Myrtle Beach, SC (US); Jon Elmaleh, Brooklyn, NY (US); Timothy Morales, Rumson, NJ (US); Curtis Elliott, Washington, NJ (US); Daniel Camisi, Tabernacle, NJ (US); Thomas Lorys, Linden, NJ (US)

(73) Assignee: Water Tech, LLC, East Brunswick, NJ (US)

( * ) Notice: Subject to any disclaimer, the term of this patent is extended or adjusted under 35 U.S.C. 154(b) by 0 days.

(21) Appl. No.: 15/961,314

(22) Filed: Apr. 24, 2018

(51) Int. Cl.

| | |
|---|---|
| ***B63H 11/04*** | (2006.01) |
| ***E04H 4/16*** | (2006.01) |
| ***B63H 11/10*** | (2006.01) |
| ***B63H 11/107*** | (2006.01) |
| ***C02F 1/00*** | (2006.01) |
| *C02F 103/42* | (2006.01) |

(52) U.S. Cl.
CPC ........... *E04H 4/1663* (2013.01); *B63H 11/04* (2013.01); *B63H 11/101* (2013.01); *B63H 11/107* (2013.01); *C02F 1/001* (2013.01); *B63H 2011/043* (2013.01); *C02F 2103/42* (2013.01); *C02F 2201/008* (2013.01)

(58) Field of Classification Search
CPC ..... E04H 4/1663; B63H 11/04; B63H 11/101; B63H 11/107; C02F 1/001
See application file for complete search history.

(56) References Cited

U.S. PATENT DOCUMENTS

| | | | | |
|---|---|---|---|---|
| 5,985,156 | A | 11/1999 | Henkin et al. | |
| 6,039,886 | A * | 3/2000 | Henkin ................. | E04H 4/1654 134/167 R |
| 6,299,699 | B1 | 10/2001 | Porat et al. | |
| 6,365,039 | B1 | 4/2002 | Henkin et al. | |
| 6,412,133 | B1 | 7/2002 | Erlich et al. | |
| 6,473,927 | B1 | 11/2002 | Sommer | |
| RE38,479 | E | 3/2004 | Henkin et al. | |
| 6,742,613 | B2 | 6/2004 | Erlich et al. | |
| 6,842,931 | B2 | 1/2005 | Porat et al. | |
| 6,971,136 | B2 | 12/2005 | Horvath et al. | |
| 7,143,502 | B2 | 12/2006 | Porat et al. | |

(Continued)

*Primary Examiner* — Stephen P Avila
(74) *Attorney, Agent, or Firm* — Husch Blackwell LLP

(57) ABSTRACT

A rechargeable robotic pool cleaning apparatus having a first water pump for providing a downward thrust force, a second water pump for providing at least a rearward thrust component, and a third water pump for providing at least a forward thrust component, the apparatus being buoyant when the pumps are not activated and including adjustable flap valves, baffles and nozzles to alter the outflow direction of at least some of the jet streams of water produced by the pumps so as to produce any one or more of a vertical, forward, rearward, and sideward thrust component depending upon the positioning of the baffles and/or nozzle members. At least one main controller is electronically coupled to a rechargeable power source for controlling the operation of the pumps in various combinations for moving the apparatus both vertically and horizontally in the body of water.

50 Claims, 25 Drawing Sheets

(56) References Cited

U.S. PATENT DOCUMENTS

| | | | | |
|---|---|---|---|---|
| 7,165,284 | B2 | 1/2007 | Erlich et al. | |
| 7,213,287 | B2 | 5/2007 | Hui | |
| 7,316,751 | B2 | 1/2008 | Horvath et al. | |
| 7,434,285 | B1 * | 10/2008 | Chang | E04H 4/1663 15/1.7 |
| 7,661,381 | B2 | 2/2010 | Gorelik et al. | |
| 7,677,268 | B2 | 3/2010 | Griffin et al. | |
| 7,690,066 | B2 | 4/2010 | Stoltz et al. | |
| 7,723,934 | B2 | 5/2010 | Adam et al. | |
| 7,827,643 | B2 | 11/2010 | Erlich et al. | |
| 7,849,547 | B2 | 12/2010 | Erlich et al. | |
| 7,900,308 | B2 | 3/2011 | Erlich et al. | |
| 8,118,943 | B2 | 2/2012 | Erlich et al. | |
| 8,241,430 | B2 * | 8/2012 | Erlich | E04H 4/1654 134/18 |
| 8,273,183 | B2 | 9/2012 | Erlich et al. | |
| 8,307,485 | B2 | 11/2012 | Sumonthee | |
| 8,343,339 | B2 | 1/2013 | Sumonthee | |
| 8,696,821 | B2 | 4/2014 | Erlich et al. | |
| 8,869,337 | B2 | 10/2014 | Sumonthee | |
| 9,062,473 | B2 | 6/2015 | Erlich | |
| 9,145,699 | B2 | 9/2015 | Ben-Dov et al. | |
| 9,222,275 | B2 | 12/2015 | Ben Dov et al. | |
| 9,290,958 | B2 | 3/2016 | Lopez | |
| 9,487,963 | B2 | 11/2016 | Michelon | |
| 9,506,263 | B1 | 11/2016 | Lopez | |
| 9,512,630 | B2 | 12/2016 | Erlich et al. | |
| 9,650,798 | B2 | 5/2017 | Erlich et al. | |
| 9,650,799 | B2 | 5/2017 | Erlich et al. | |
| 9,657,488 | B2 | 5/2017 | Pichon et al. | |
| 9,670,688 | B2 | 6/2017 | Erlich | |
| 9,683,383 | B2 | 6/2017 | Shiomi-Shlomi et al. | |
| 9,809,990 | B1 * | 11/2017 | Hui | E04H 4/1654 |
| 2014/0076789 | A1 * | 3/2014 | Shlomi-Shlomi | E04H 4/1654 210/195.1 |
| 2014/0262997 | A1 * | 9/2014 | Renaud | E04H 4/1663 210/138 |
| 2014/0284258 | A1 * | 9/2014 | Kellogg | E04H 4/1663 210/167.16 |
| 2015/0143643 | A1 * | 5/2015 | Cavagnol | E04H 4/1654 15/1.7 |

* cited by examiner

DETAIL A

DETAIL A'

RECHARGEABLE ROBOTIC POOL CLEANING APPARATUS

The present invention relates generally to methods and devices for automatically cleaning swimming pools and other contained bodies of water having surfaces to be cleaned, hereinafter referred to as swimming pools, and, more particularly, to a new and useful rechargeable robotic pool cleaning apparatus for autonomously cleaning swimming pool surfaces utilizing water jet pump propulsion for its sole means of movement both vertically and horizontally.

BACKGROUND OF INVENTION

Robotic pool cleaners have existed in the market place for some time. Numerous prior art exists disclosing a wide variety of different types of automatic swimming pool cleaners, most of which utilize an external power source provided at the surface of the pool for providing power to the cleaner. For example, some prior art cleaners require plugging the cleaner into an outdoor electrical socket, using a floating battery connected by a length of cable, or using a supply of pressurized water from a pump. In all of these different types of robotic pool cleaners, the cables or cords, which are tethered to the cleaner, used to supply power to the cleaner can get tangled and can impede the functionality of the robot as it moves through the pool. In addition, most automatic pool cleaners are substantially heavier than water thereby requiring the user to lift a substantial weight to the surface of the pool usually by pulling on the supply lines or, in some cases, utilizing a hook or winch to lift the cleaner to the water surface.

In addition, there are some cordless battery operated robotic pool cleaning devices. See for example, U.S. Pat. No. 6,294,084 to Henkin as well as Applicant's U.S. Pat. No. 9,399,877. These devices include a complicated propulsion system involving gears, belts, pulleys and other mechanisms for rotating and driving wheels associated with such devices along the floor and wall surfaces, hereinafter referred to as wall surfaces, of the pool to be cleaned and further include brush assemblies, a plurality of valves, inlet and outlet ports, hoses, filter bags accessible only from the bottom of the unit, and in the case of the cleaner disclosed in U.S. Pat. No. 6,294,084 to Henkin, a level control subsystem that includes a closed fluid chamber containing an airbag used to modify the buoyancy of the apparatus for submerging and raising the cleaner in the water. All of these devices are extremely complicated, expensive and include numerous parts that can fail, need repair, or simply cannot be repaired. Other prior art units are heavy and difficult to remove from the pool; some units must be manually retrieved from the bottom of the pool; some units employ complicated and expensive valve or ballast assemblies; and some units utilize filter bags which are difficult to clean and maintain.

Still further, U.S. Pat. No. 6,412,133 to Erlich discloses a tethered swimming pool cleaner that uses a single directionally controlled water jet propulsion system that utilizes a complicated diverter or deflector system for varying and changing the directional discharge of the water jets for controlling the direction of travel of the cleaner. Here, orientation of the discharged water jet is varied by the diverter system to provide a downward component or force vector, lateral components, or a combination of both to complement the translational force. During the change from one water jet discharge position to another water jet discharge position, the cleaner must be stabilized by interrupting the flow of water from the discharge conduit, such as by interrupting power to the pump motor or discharging water from one or more orifices. This is a complicated and inefficient method for providing water jet propulsion to the cleaner.

In view of the foregoing, it is therefore desirable to provide a cordless robotic pool cleaning apparatus which is easy and simple to operate and maintain, does not use a wheel driven system for propulsion, is lightweight and easy to carry, utilizes a buoyant design which allows the unit to return to the pool surface when the cleaning cycle is completed thereby negating the need for a user to perform manual labor in retrieving the machine from the bottom of the pool, and which does not use a complicated valve or diverter system for any of its operations. These and other features and advantages of the present unit will become apparent to those skilled in the art after reading the present disclosure.

SUMMARY OF INVENTION

The present invention is directed to an underwater rechargeable robotic pool cleaning apparatus which is powered by rechargeable batteries or other rechargeable power sources and utilizes water jet pump propulsion as its sole means of movement both vertically and horizontally in a pool of water. The present cordless robotic apparatus is specifically designed to autonomously clean the bottom wall surface of a swimming pool or other contained body of water on its own and once the cleaning cycle has been completed, the present apparatus will automatically return to the water surface. The present unit is unique in that it is propelled solely by a singular pump assembly with 3 separate or individual waterjet pumps contained therein having propellers, impellers, or combination thereof, one water jet pump configured for providing a vertical drive force to selectively submerge the present unit from the water surface to the bottom wall pool surface and to maintain the present unit adjacent the bottom wall pool surface for collecting debris associated with such bottom wall surface. The other two water jet pumps are positioned so as to provide at least a component force in the forward and rearward direction so as to move the present unit across the bottom wall pool surface in a forward or rearward direction. These pumps include adjustable baffles and/or exhaust nozzles which can be selectively positioned so as to alter the generally straight path of the unit on the bottom pool surface and to provide a lateral turning radius or curved path to the unit during normal operation. These baffles and/or exhaust nozzles can be adjusted to vary the water jet outflow angle so as to turn the present unit as well as to provide additional diving thrust and slow down the cleaner so that a greater quantity of debris may be removed from the pool. A user can experiment with the outflow angles and settings of the forward and rearward baffles/nozzle ports to create an optimal cleaning pattern for a particular pool design. This feature permits the present unit to effectively cover any shape or size pool.

The present apparatus also includes one or more duckbill valves located on the bottom surface of the unit for intaking water and debris from the bottom surface of the pool and funneling that water through a filter assembly where debris gathered from the bottom pool surface can be collected and stored for removal from the unit once the cleaning cycle has been completed. The present filter assembly is easily accessible and removable from the front portion of the unit and does not require the unit to be removed from the water. By removing the filter assembly before the unit is manually retrieved from the water, virtually no water is retained inside the unit and therefore no water is removed from the pool or other contained body of water. Removing the filter assembly prior to lifting the present unit out of the water source also lessens the overall weight of the unit and makes it much easier to pull the unit from the water source.

Also, importantly, the present unit includes a buoyant design which means that the present unit will float on the water surface when in its off state. Since the present unit automatically returns to the water surface once the cleaning cycle is completed, this buoyant feature means that little to no effort is needed by a user to lift the unit to the surface for cleaning or removal. The present unit also includes a removable control box which houses both the rechargeable battery and the electronics, each isolated from each other through the use of a main plate which functions as an isolation plate and possibly a heat sink between the battery components and the electronic components. Housing these two main components in a single control box makes it easy for a user or technician to remove just a single control box to either replace or repair the battery and/or electronic components contained therein, or to upgrade the unit with new electronics, programming, and/or larger battery, if necessary. This control box also provides an interface for the user with exterior controls for controlling the operation of the present unit including a main power switch, a charger port and cover, and a display and lights for showing the state of the rechargeable battery or any other indications deemed necessary for the user interface, including but not limited to, error messages, or confirmation of user inputs through button presses and/or wireless/Bluetooth connectivity. The three water jet pumps are likewise packaged together in a single housing and are likewise easily accessible by a user or technician. The overall construction of the present apparatus therefore has only two major components associated with its operation, namely, the water jet pump unit and the battery/electronics unit. Both components are snap fitted, although alternate securing mechanisms are envisioned into the present assembly. These are the only critical parts that a user or technician needs to access for replacement or upgrades. This means that maintenance of the present unit is as simple as possible. By undoing a connection, such as a snap fit connection, screw on connection, or any other connection known to those skilled in the art, these components are disconnected and may be repaired or replaced with upgraded units as needed.

The electronics associated with the present unit also includes at least one main controller with memory for controlling the operation of the unit. Various programs are stored within the memory of the main controller including a start program, a submersion program, a cleaning program, and a check condition of the unit program. The controller is in communication with the pump motors, the tilt and current sensors, and other electronics and controls the operation of the pumps based upon inputs from the sensors and the particular program selected for operation. Tilt sensors are provided to detect a tilt situation and to communicate with the electronics to correct the situation. Protection circuits and at least one current sensor are also provided to protect the pump motors and other components from overheating or excess current draw.

After activating the present unit by depressing the main power switch, or, in an alternative embodiment, utilizing a remote control activation system such as radio signals or the like, a user sets the present unit into the body of water whereupon all air trapped inside the present unit is evacuated through the top air exhaust vent associated with the main dive pump as the unit settles in its floating position. This feature ensures that submersion of the present unit and lifting the present unit with or without collected debris is consistent and reliable regardless of the density of the fluid into which the present unit is inserted, namely, salt water versus fresh water pools. After a predetermined period of time, or once the water level has been detected to have risen above a predetermined point, the submersion procedure is activated sending jets of water generally upward and outward to provide a downward thrust. This downward force is then pulsed to provide an initial submersion process that removes any remaining trapped air in the unit that may alter the performance of the present machine under water. This pulsing process also adds water to a top recess associated with top air exhaust valve which also helps to initially push the unit down to the bottom wall pool surface. The check condition program then runs continuously to ensure that the unit has submerged below the water surface.

Once the present apparatus reaches the bottom wall pool surface, the main diving pump is kept on for predetermined intervals to guarantee consistent ground coverage of the pool bottom surface. This center dive pump is specifically designed to produce a downward thrust force so as to hold the present unit adjacent the bottom wall pool surface during its cleaning cycle. During this time, the front and rear water jet pumps are activated in accordance with the cleaning path program which is likewise stored within the controller of the present unit to create thrust driving the present unit in either a generally forward or a generally reversed direction. Intermittently, the present unit may disengage all pumps to permit momentary movement upward. This feature allows the present unit to overcome obstacles during the cleaning cycle, such as main drains or large objects incapable of fitting inside the inlets (such as pool toys).

Battery status is indicated throughout the operational cycle of the present device and is visible under water through the use of a display associated with the interface panel. Once the battery has discharged a pre-determined percentage or dies, or once the cleaning cycle is complete, the present unit will automatically rise to the surface of the pool. This is accomplished by turning off all pumps and allowing the buoyant design of the present unit to automatically allow the present unit to ascend to the water surface. Once there, in an alternate embodiment, a user may activate a remote control device to coerce the present unit to move in a forward or reverse direction to reach one edge of the pool, or may use a hook feature to manually coerce the unit to the edge of the pool. Once the unit is accessible at a side of the pool, and while still in the water, a user may remove the filter assembly by pulling the filter assembly forward to remove it from the present unit. The user may then remove a detachable screen or other filter mesh material associated with the filter unit so as to dispose of the debris collected therein. The interior chamber of the filter assembly can be rinsed to remove any excess debris and the filter assembly can either be placed back into the unit for an additional cleaning cycle, or the unit can be manually retrieved from the water surface. In this regard, the present unit includes easily accessible handles that rest above the water surface for retrieving the unit from the pool when in its floating state. Once the unit has been retrieved from the water surface, a user can reattach the filter assembly, charge the present unit, and then set it back into the pool for another cleaning cycle. In an alternate embodiment, induction charging may also be used to permit in water and out of water charging.

The present apparatus can be used for automatically cleaning the bottom surface of any water pool contained in an open vessel defined by a wall having bottom and side portions such as fountains, above ground swimming pools, in-ground swimming pools and the like. The present unit provides a simple, easy to use, easy to retrieve rechargeable robotic pool cleaning device which represents an improvement over the known pool cleaners in the marketplace.

These and other specific aspects and advantages of the present invention will be apparent to those skilled in the art after reviewing the following detailed description of several illustrated embodiments set forth below which, taken in conjunction with the accompanying drawings, disclosed improved features of a rechargeable robotic pool cleaning apparatus.

BRIEF DESCRIPTION OF THE DRAWINGS

For a better understanding of the present invention, reference may be made to the accompanying drawings.

DETAILED DESCRIPTION OF THE INVENTION

Figure 1:
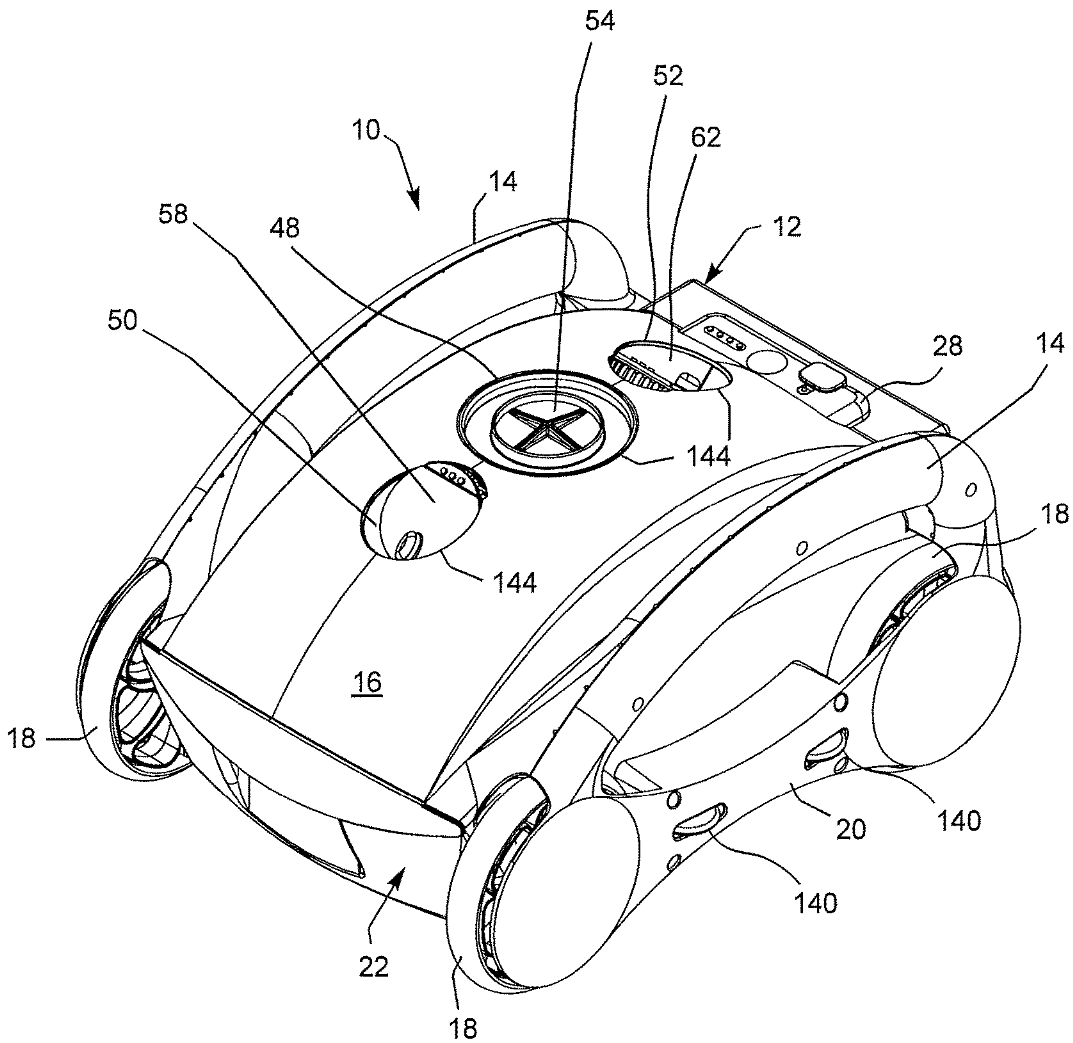
FIG. 1 is a perspective view of one embodiment of a rechargeable robotic pool cleaning apparatus constructed in accordance with the teachings of the present invention.
Figure 2:
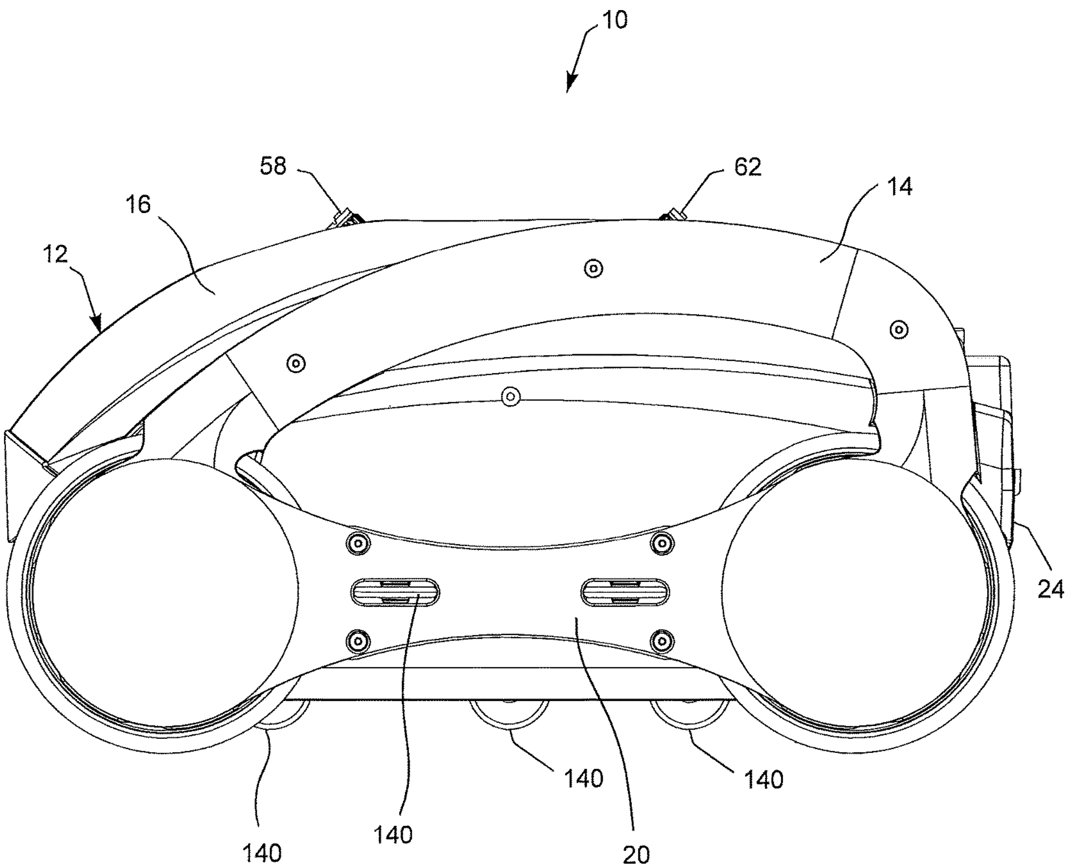
FIG. 2 is a right side elevational view of the apparatus of FIG. 1.

Several embodiments of the present invention will now be explained with reference to the accompanying drawings. It will be apparent to those skilled in the art from this disclosure that the following description of the various embodiments of the present rechargeable robotic pool cleaning apparatus is provided for illustration purposes only and not for the purpose of limiting the present invention as defined by the appended claims and their equivalents. Although the present invention discussed herein is directed to cleaning the bottom wall surface of a swimming pool, it is recognized and anticipated that the present rechargeable robotic pool cleaning apparatus can be utilized to clean any contained body of water having a bottom wall surface.

Referring to the drawings more particularly by reference numbers wherein like numbers refer to like parts, the number 10 in FIGS. 1-21 refers to one embodiment of a cordless, rechargeable and autonomous robotic apparatus for cleaning the bottom wall surfaces of a swimming pool or other contained body of water constructed in accordance with the teachings of the present invention. The present apparatus 10 includes a body structure 12 as best illustrated in FIGS. 1, 2 and 4-8 which includes a pair of handle members 14, a lid member 16, a pair of front and a pair of back wheel members 18 which, in an alternate embodiment, the wheel members may be buoyant, a pair of side outer cover members 20, a front slidably removable filter assembly 22, a rear panel member 24, a bottom panel member 26 which is part of the filter assembly 22, and an interface enclosure member 28.

Figure 9:
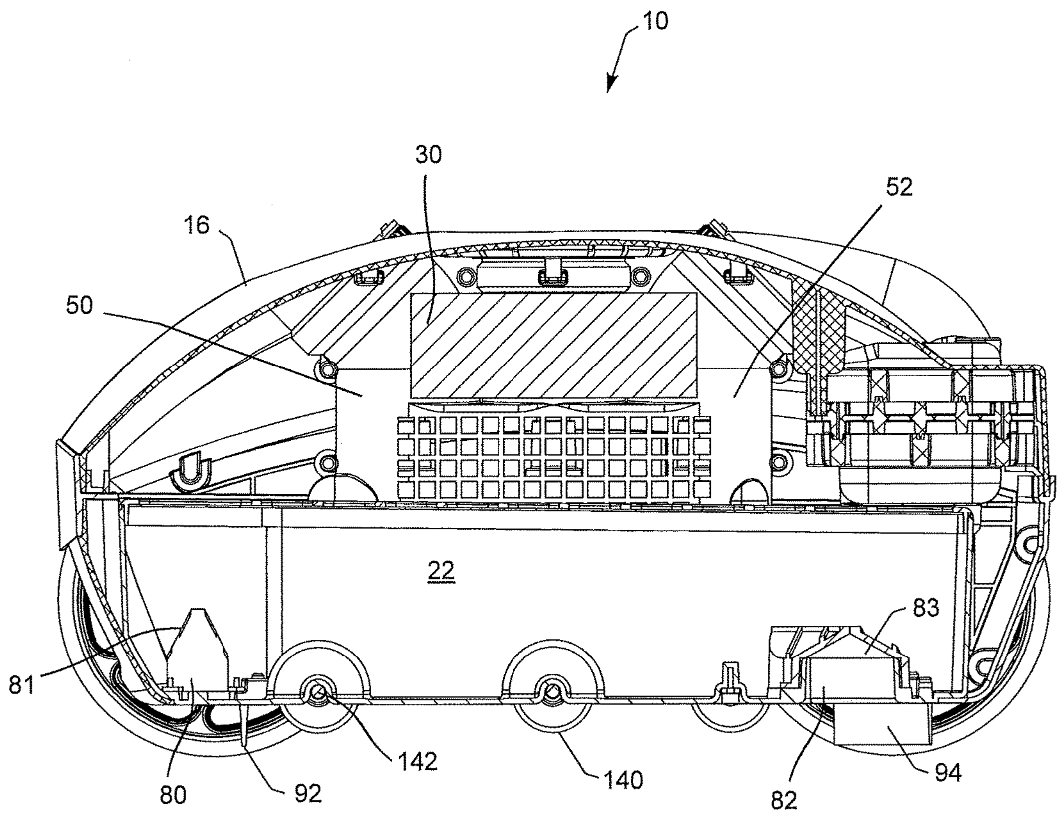
FIG. 9 is a cross-sectional view taken along a longitudinal axis of the apparatus of FIG. 1 showing one embodiment of a block of buoyant material associated with the present apparatus.

The overall body structure 12 as well as all of the additional components that will be hereinafter further explained result in an overall unit which is lighter than water thereby enabling the present unit to float at a position proximate to the water surface when in its off state. The present unit may include a block of buoyant material such as foam block 30 as best illustrated in FIG. 9 which can be strategically positioned within the body structure to maintain the buoyant characteristics of the unit. It is recognized and anticipated that any number of foam or buoyant inserts such as insert 30 may be strategically sized and located within the overall body structure 12 of the present unit so as to maintain a center of gravity below the center of buoyancy of the present apparatus but still allow the present unit to float at the water surface when in its off state. The present buoyant insert 30 or any plurality of such inserts can be tucked away above and/or below various components of the present device wherever space exists, if necessary. The size and shape of such inserts 30 may likewise vary depending upon where such inserts are going to be positioned within the body structure 12. The total buoyancy of the present unit 10 can be adjusted and any plurality of inserts 30 can be used to keep the total density of the unit 10 at a positive buoyancy so that the unit 10 will float. A low center of gravity also helps to prevent the present unit from flipping over during its descent to the bottom wall pool surface or its ascent to the water surface. A center of gravity below the center of buoyancy near the central area of its vertical axis such as vertical axis V in FIG. 12 also helps to keep the unit 10 upright and self-righting when in the water at any orientation.

Figure 3A:
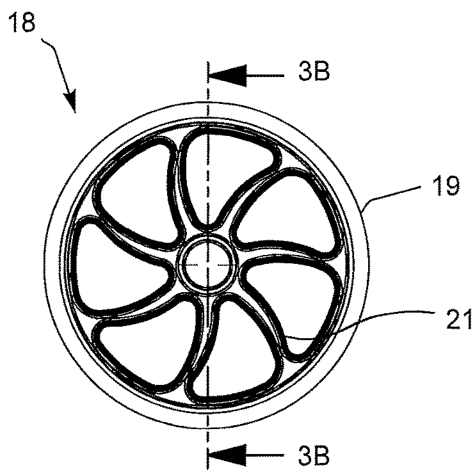
FIG. 3A is a side elevational view of one of the front and rear wheel members associated with the apparatus of FIG. 1 constructed in accordance with the teachings of the present invention.
Figure 3B:
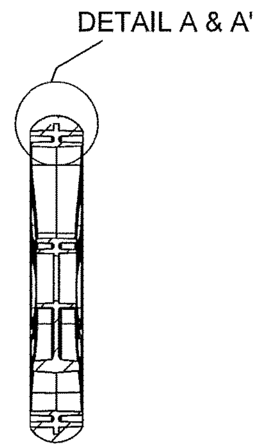
FIG. 3B is a cross-sectional view of the wheel member of FIG. 3A taken along line 3B of FIG. 3A.
Figure 3C:
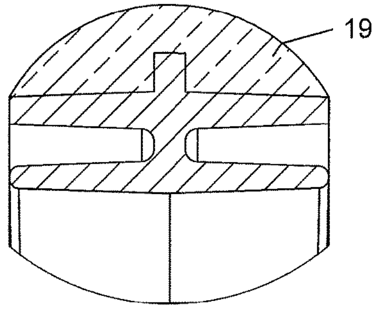
FIG. 3C is an enlarged detailed cross-sectional view of one embodiment of the wheel member of FIG. 3B.
Figure 3D:
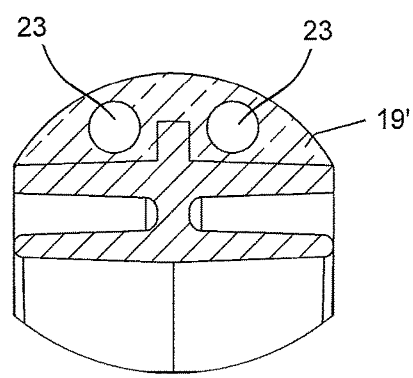
FIG. 3D is an enlarged detailed cross-sectional view of an alternative embodiment of the wheel member of FIG. 3B.
Figure 4:
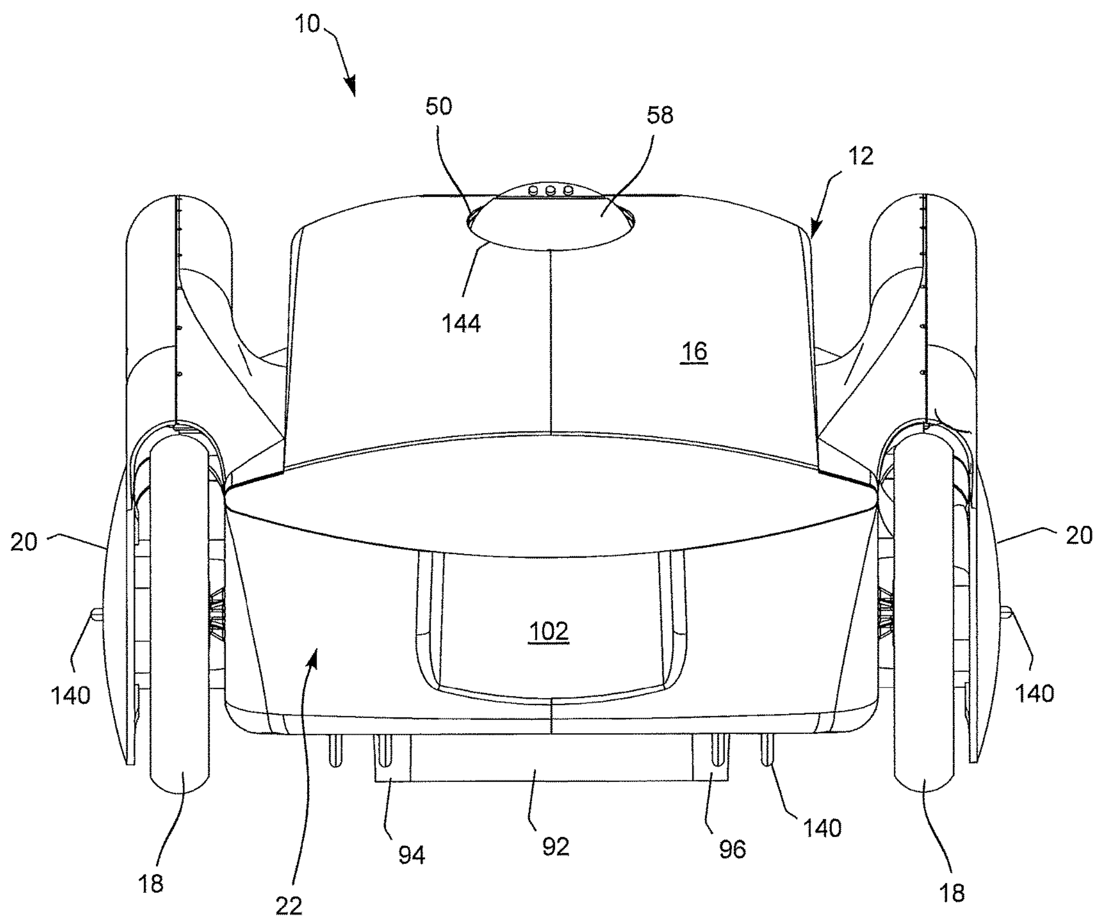
FIG. 4 is a front elevational view of the apparatus of FIG. 1.

FIGS. 3A and 3B illustrate one embodiment of the front and rear wheels 18 which includes an outer wheel portion 19 and a plurality of inner spokes or interconnecting members 21. FIGS. 3C and 3D are an enlarged cross-sectional view of detail A and A' in FIG. 3B showing the intersection of the outer wheel portion 19 with an innerspoke 21. In one embodiment, the front and rear wheels 18 may include a buoyant material such as foam, another equivalent buoyant molding material as will be discussed with respect to FIG. 3C, or may be blow molded to provide a hollow sealed structure as best illustrated in FIG. 3D as will be hereinafter further explained. As best illustrated in FIG. 3C, the outer wheel portion 19 may be made entirely or partially of a buoyant material. In alternative embodiments, the entire wheel 18 may be made of a buoyant material or portions thereof depending upon the overall weight of the unit 10. In still another alternative embodiment as best illustrated in FIG. 3D, the outer wheel portion 19' can be made of any material, not specifically a buoyant material, and the outer wheel portion 19' can include any one or a plurality of hollow portions 23 which contribute to the buoyancy of the overall wheel structure. In other words, the hollow portions or spaces 23 function as a buoyant design to further lighten the overall weight of the individual wheel structures so as to contribute to the buoyancy of the overall unit. The hollow spaces 23 can extend completely around the circumference of the outer wheel portion 19', or they can extend partially therearound. In addition, any plurality of spaces 23 can be located within the outer wheel portion 19', or other portions of the overall wheel structure.

Figure 10:
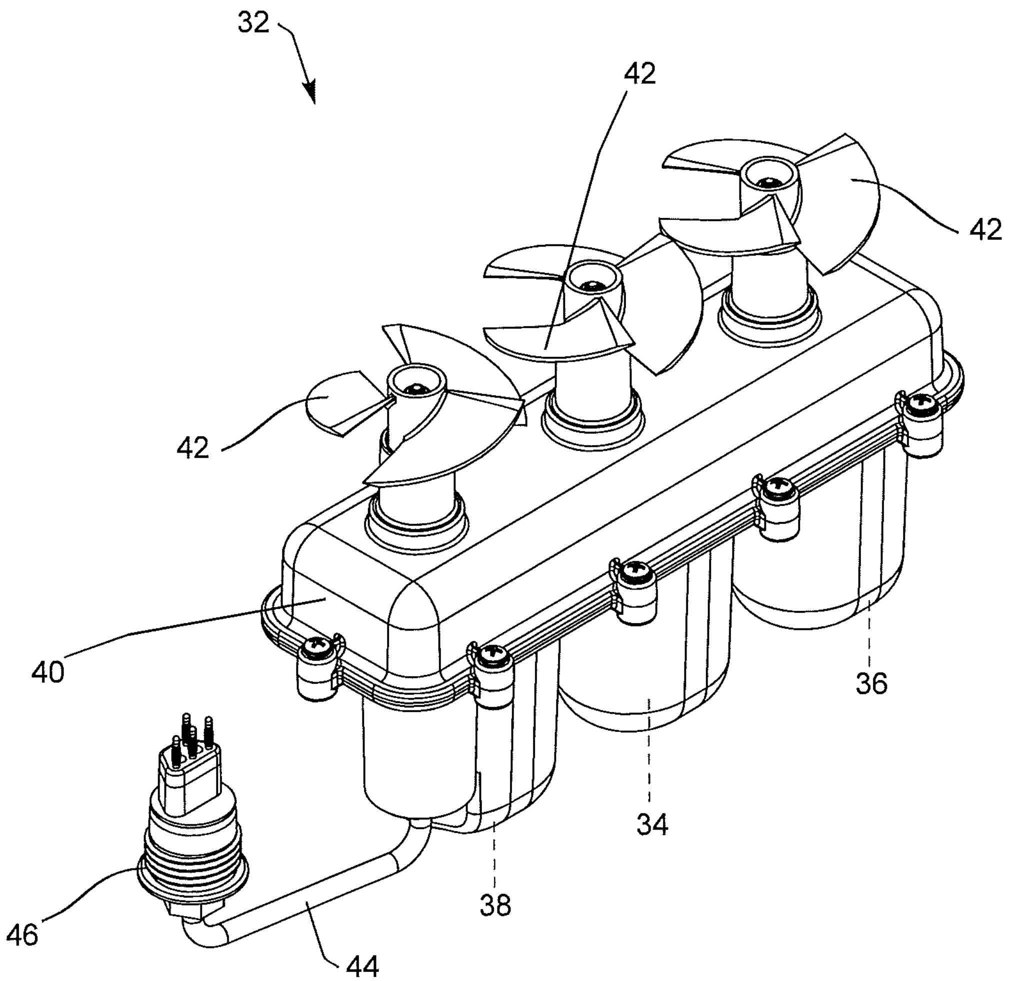
FIG. 10 is a perspective view of one embodiment of a pump assembly associated with the apparatus of FIG. 1.
Figure 11:
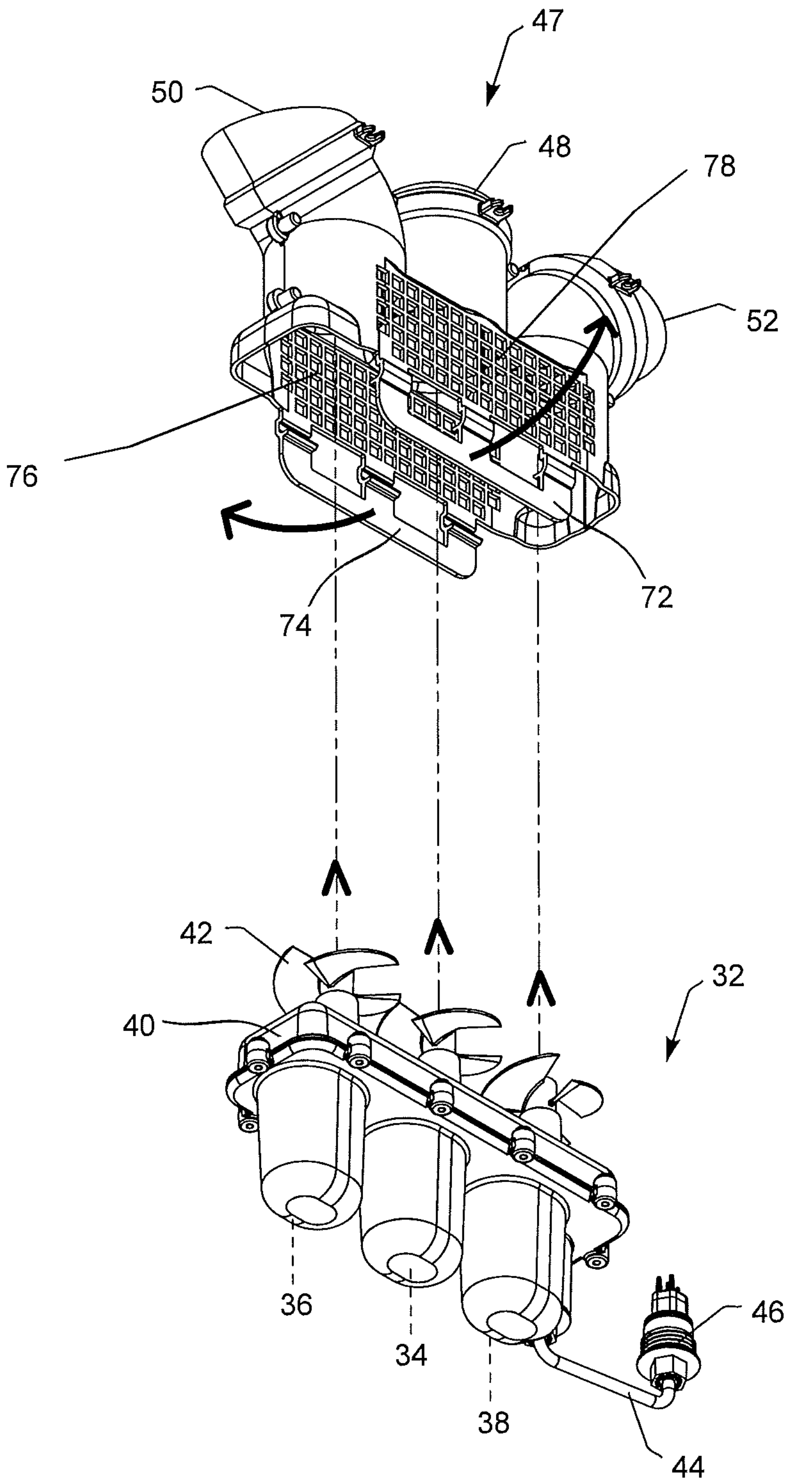
FIG. 11 is an exploded perspective view of the pump assembly of FIG. 10 preparatory to being inserted into a corresponding discharge duct assembly.
Figure 12:
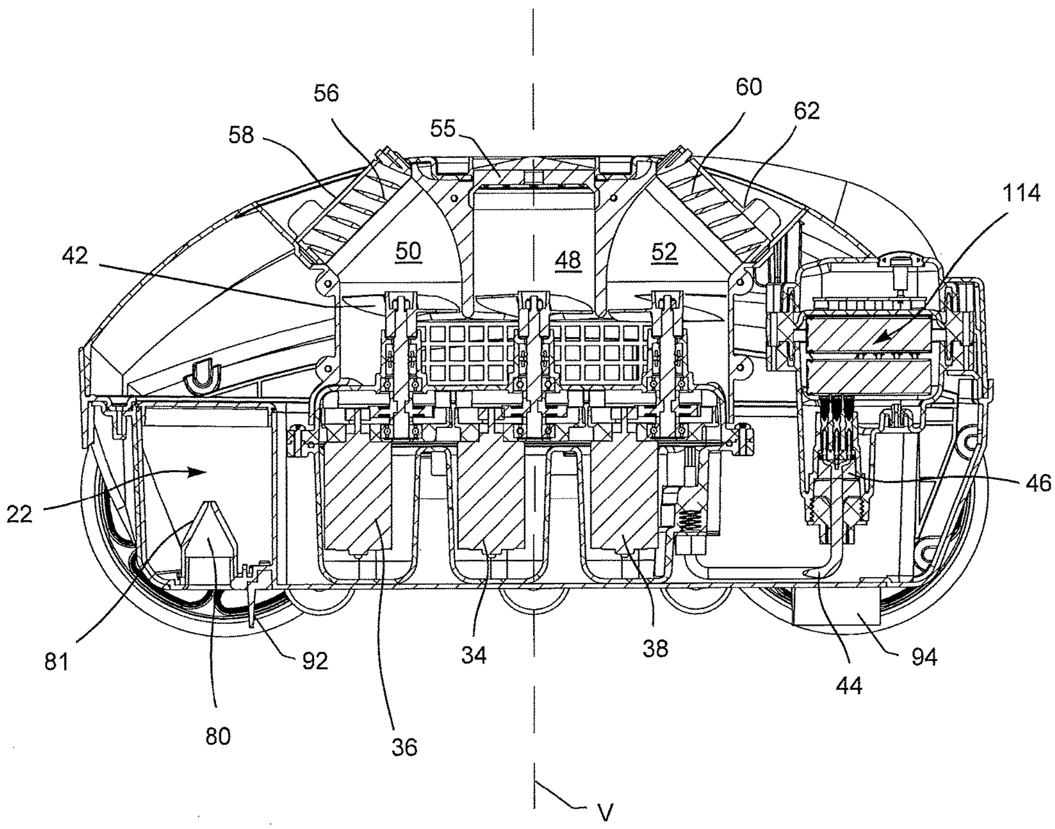
FIG. 12 is a cross-sectional view taken along the longitudinal axis of the apparatus of FIG. 1 showing the pump assembly and duct assembly installed within the apparatus of FIG. 1.
Figure 13:
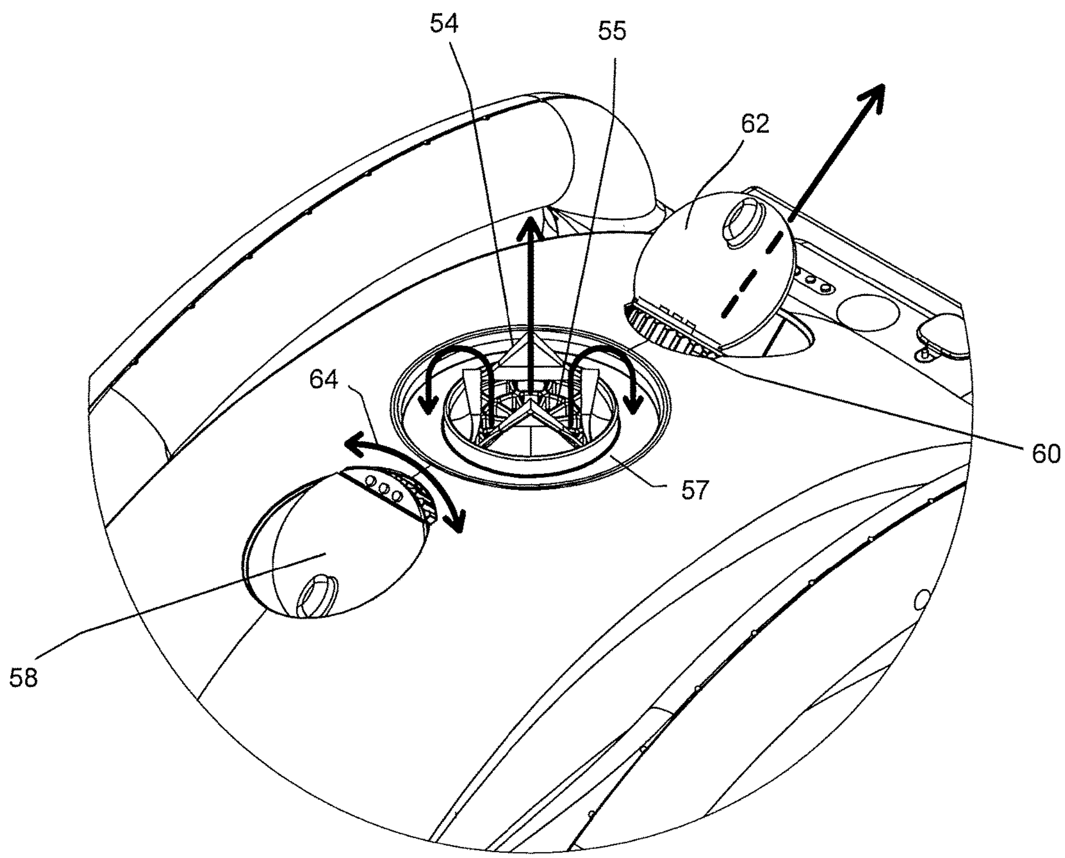
FIG. 13 is a partial perspective view of the top portion of the apparatus of FIG. 1 showing the center exhaust valve assembly and its corresponding front and rear flap valve assemblies.

As best illustrated in FIGS. 10-12, the present apparatus includes a water jet propulsion system 32 which, in one embodiment, includes a center dive water jet pump 34, a front water jet pump 36 and a rear water jet pump 38 all housed in a side-by-side relationship within a pump body or housing 40 which is sealed to exclude water as best illustrated in FIG. 10. It should be understood that by referencing 34, 36, and 38 we are referencing the associated motor and impeller pump assemblies which are all housed within water jet propulsion system 32. Each pump includes a DC motor and a drive mechanism operatively connected to a respective impeller 42 for generating the necessary force vectors to propel the present unit both vertically and/or horizontally as will hereinafter be further explained. Each respective pump motor is wired to a connector wire 44 which is coupled to a connector plug 46 for connection to a battery package as will be hereinafter explained. The pump housing 40 and its associated pumps 34, 36 and 38 are positioned within the body structure 12 as best illustrated in FIGS. 11 and 12 such that the respective pumps and their corresponding impellers 42 are positioned either adjacent to or within corresponding discharge duct members or outlets 48, 50 and 52 as best illustrated in FIGS. 11 and 12. Duct member outlet 48 is associated with the center dive pump 34 and is directed in a vertical direction such that when the pump 34 is activated, water is drawn into the unit as will be hereinafter further explained and propelled upward through the center duct member 48 and out the top exhaust valve 54 as best illustrated in FIG. 13. The flexible exhaust valve member 54 is positioned and located at the terminal end portion of duct member 48 and sits on top of an open grid type cap member 55 as best seen in FIGS. 12, 13, 14A, 14B and 14C. The valve 54 is a one-way valve which opens upwards as seen in FIG. 13 to allow water and/or air to escape therefrom. When the center dive pump is activated, a first jet of water is ejected upward as illustrated in FIG. 13 thereby producing a downward thrust which pushes the overall unit 10 downward towards and against the bottom wall pool surface. The one-way valve 54 allows air to escape from inside the duct member 48 regardless of whether the center drive pump 34 is on or off, and when the center dive pump 34 is activated, air escaping through the valve 54 does not impede the operation of the unit 10. In all circumstances, the valve 54 prevents air from outside the unit 10 from entering center duct member 48 and the overall assembly.

The front pump 36 includes a DC motor and a drive mechanism coupled to its impeller 42 and it is also positioned such that its impeller is positioned adjacent to or within discharge duct member or outlet 50 as again best illustrated in FIG. 12. Front pump 36, when activated, pushes or forces a second jet of water through duct member 50. Duct member 50 is curved as illustrated in FIG. 12 so as to allow water to escape at an outflow trajectory which is at an angle relative to the vertical axis of the body structure thereby producing a force thrust component in both the vertical and rearward direction. Duct member 50 includes a baffle 56 and a flap valve 58 as best illustrated in FIG. 12. The baffle 56 directs water in a forward and/or vertical direction when pump 36 is activated and is selectively adjustable as will be hereinafter explained to alter the angle of attack or outflow angle of the jet stream of water exiting therethrough. The flap valve 58 opens to allow water and/or air to escape the valve. Flap valve 58 is hinged at one end portion of the duct member 50 and is responsive to the force generated by the flow of water therethrough to ensure consistent movement speed in the water. The same configuration is associated with duct member 52 which includes a baffle 60 and another flap valve 62 which is likewise hingedly attached to duct member 52 as best illustrated in FIG. 12. Here again, rear pump member 38 includes a DC motor coupled to its impeller 42 through a corresponding drive mechanism and, when activated, a third jet of water is similarly forced through the baffle 60 which is directed towards the rear of the present apparatus thereby resulting in a force thrust component in the forward direction. Flap valve 62 opens to allow the third jet of water to escape from duct member 52 as illustrated by the arrow in FIG. 13. Flap valves 58 and 62 also close as power decreases to again ensure consistent speed through the water.

Figure 14A:
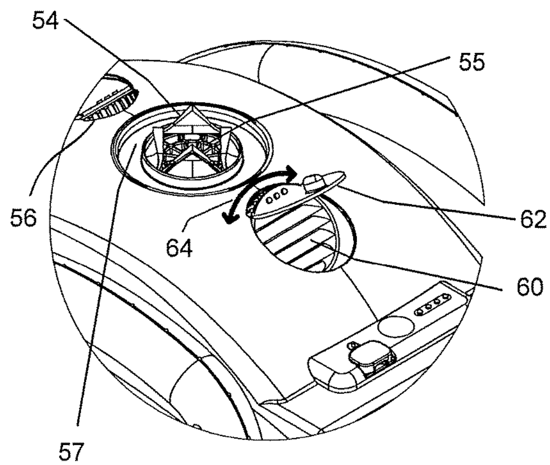
FIGS. 14A, 14B and 14C are partial perspective views showing the selectively adjustable positioning of the front and rear exhaust flap valves and baffles.
Figure 14B:
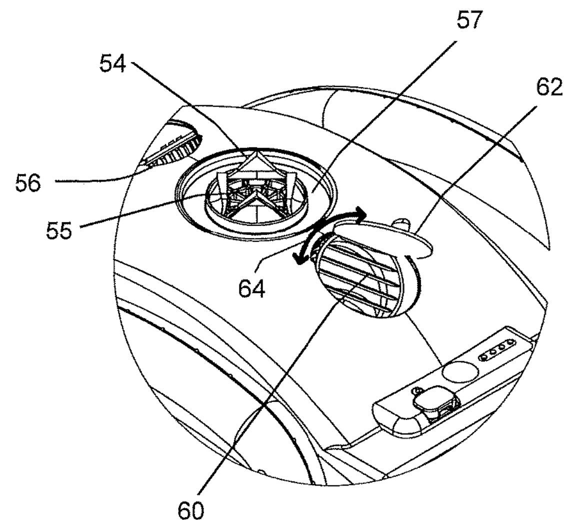
Figure 14C:
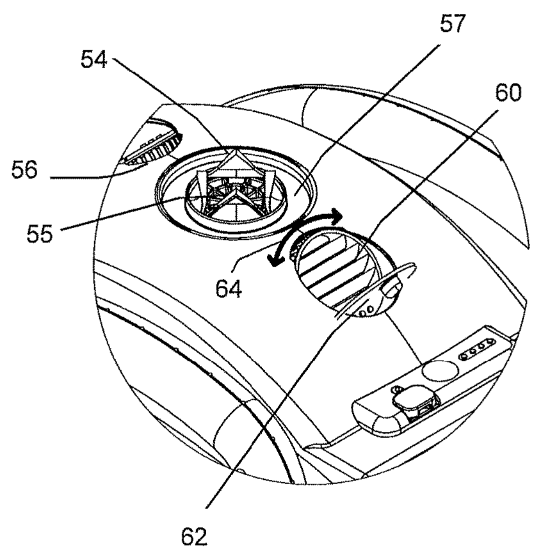

As best illustrated in FIGS. 13, 14A, 14B and 14C, flap valves 58 and 62 and baffles 56 and 60 are selectively rotatable through the use of scroll wheel type rollers as indicated by the arrow 64 so as to alter the angle of attack or outflow angle of the jet stream exiting the respective front and rear duct members 50 and 52 so as to change the direction of travel of the overall unit. Depending upon the direction of the jet of water exiting the front and rear baffles 56 and 60, various forward, rearward, and downward thrust vectors can be achieved so as to control both the vertical, horizontal and sideward direction of the unit 10. FIGS. 14A, 14B and 14C illustrate the rotation of baffle 60 and flap valve 62 through 180° of rotation. Baffles 56 and 60, in alternative embodiments, can also be adjustable or rotated in the vertical direction similar to nozzle members 66 as explained below. This will allow adjustability in both the horizontal and vertical direction.

Figure 15:
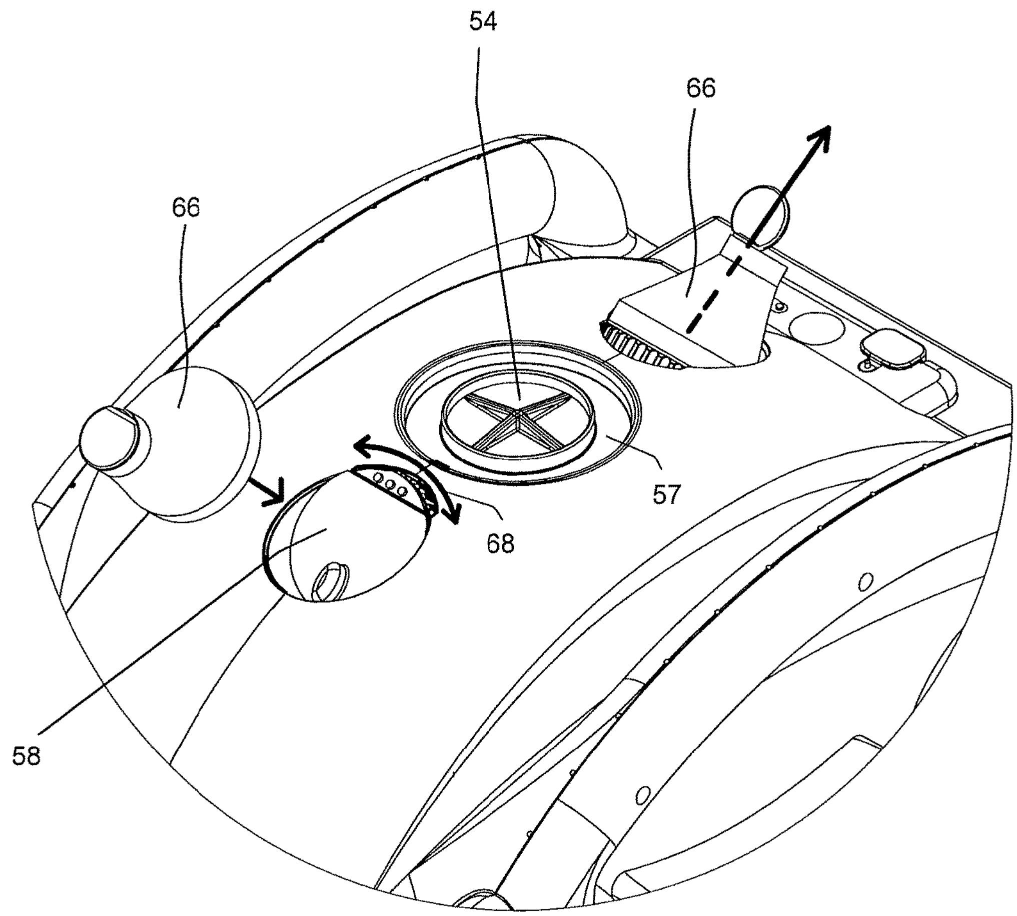
FIG. 15 is a partial perspective view showing use of the selectively adjustable nozzle ports which may or may not be used in conjunction with the front and rear exhaust flap valves and baffles.
Figure 16:
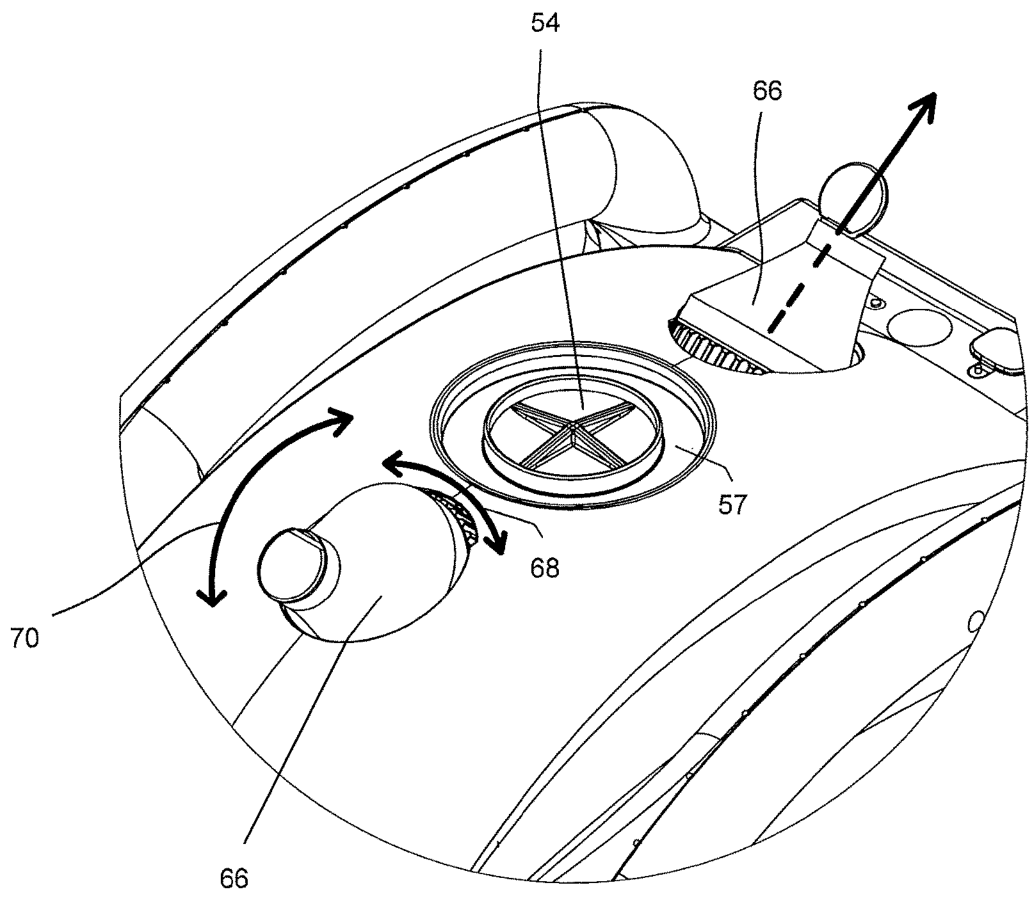
FIG. 16 is a partial perspective view showing the adjustability of the nozzle ports of FIG. 15.

As best shown in FIGS. 15 and 16, selectively attachable, detachable nozzle members 66 can likewise be attached to the front and rear duct members 50 and 52 to further control the outflow direction of the water jet exhaust expelled from the front and rear duct members 50 and 52 when the respective pumps 36 and 38 are activated. Each nozzle member 66 can be rotated in a somewhat horizontal plane as indicated by arrow 68 and such nozzle members can likewise be rotated in a vertical direction as indicated by arrow 70. Use of the nozzle member 66 allows a user to more precisely and accurately position the respective nozzle members 66 to achieve the desired lateral control, turning radius, and speed of the present unit as previously explained. Attachment and movability of the respective nozzle members 66 is illustrated in FIGS. 15 and 16. It is recognized that the present unit 10 can be operated without the baffles 56, 60, the flap valves 58, 62 and the nozzle members 66, or with any combination of such components. The baffles 56 and 60 and nozzle members 66 are utilized to allow a user to more easily modify and control the outflow direction of the second and third jet streams of water to create a force to turn the unit 10 during its cleaning process, and flap valves 58 and 62 are utilized to keep excess air out of the overall unit and force all suction to the bottom of the unit as will be further explained.

As best illustrated in FIG. 11, the pump assembly 32 is easily positionable and insertable into the duct assembly 47 by flexing a pair of snap arms 72 and 74 and snap fitting the pump assembly into the duct assembly 47. Once the pump assembly 32 is positioned within the duct assembly 47, the snap arms 72 and 74 spring back to a closed position. This entire subcomponent of the present apparatus is easily accessible and can be easily removed for maintenance. Filter screens 76 and 78 associated with the duct assembly 47 filters water that is fed into the duct assembly 47 through the operation of any one or more of the pumps 34, 36 and 38. These filter screens prevent any debris from entering the pump assembly 32 and hindering its operation.

Figure 6:
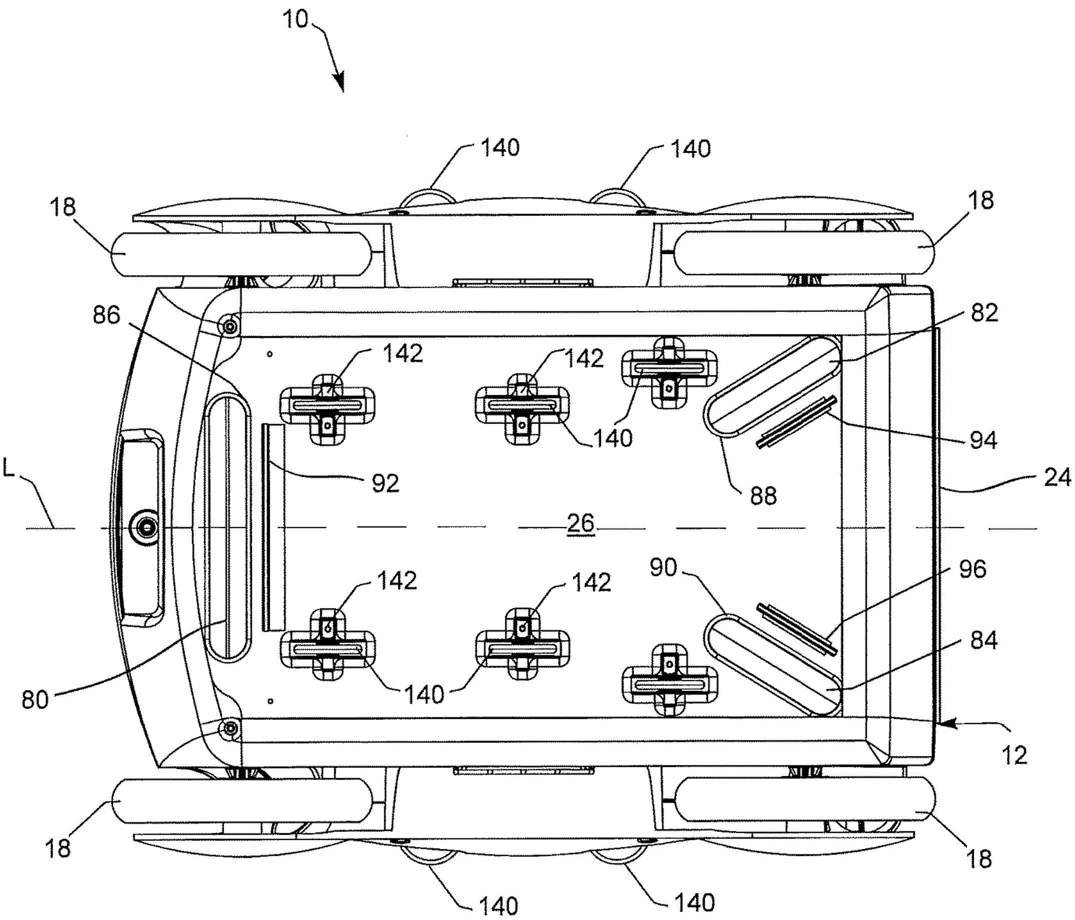
FIG. 6 is a bottom plan form view of the apparatus of FIG. 1.
Figure 18:
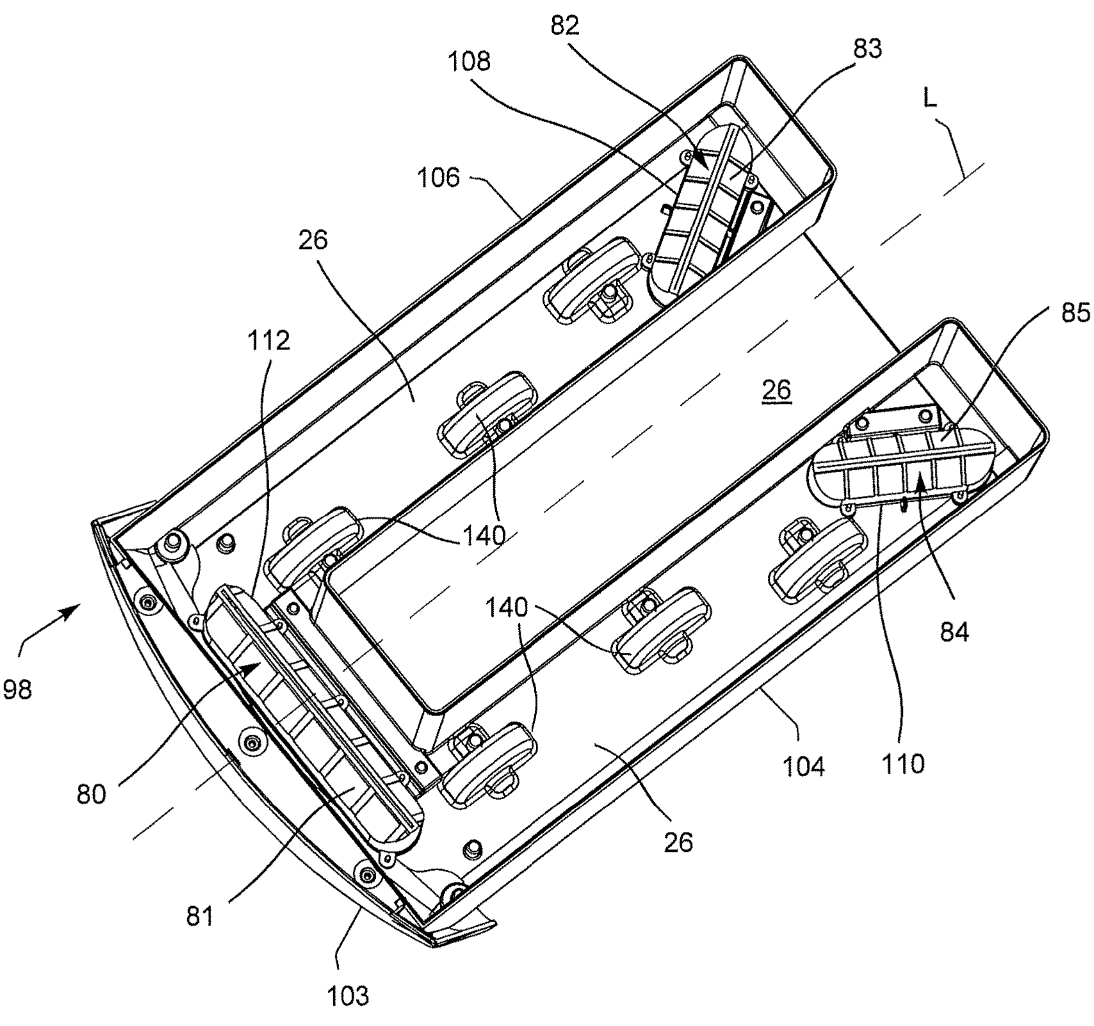
FIG. 18 is a top perspective view of the filter assembly of FIGS. 17A and 17B showing the position and location of the outlet portion of the respective duckbill valves extending into the filter assembly.

Referring to FIGS. 10-16, the respective pumps 34, 36 and 38 may operate together to generate thrust mostly in the vertical direction, or they may be operated independently of each other to provide angled thrust thereby allowing the present unit to move in a forward or rearward direction and, depending upon the positioning of the baffles 56 and 60 and/or the nozzle members 66, also allowing the unit 10 to move in a curved or sideward direction as will be further explained. The pumps 34, 36 and 38 operate in a conventional manner to spin the impellers 42 when the respective pump motors are activated. Turning of the impellers 42 cause water to flow into the duckbill valves 80, 82 and 84 positioned on the bottom portion of the unit as best illustrated in FIG. 6. Duckbill valves 80, 82 and 84 are one-way valves well-known in the art and include an inlet or intake portion for receiving water from the pool and an outlet portion for allowing the water to exit the valve. Duckbill valves 80, 82 and 84 each include a respective flexible flapper portion 81, 83 and 85 having a pair of opposite-facing flapper blades or walls with engaged together outlet edges extending in a transverse direction when no water is passing through the valve as best seen in FIGS. 9, 12 and 18. The flexible flapper blades extend between the inlet and outlet portions of the valve and the inlet edges are spaced apart connected to a valve mount mechanism as shown in FIGS. 9 and 12. Each duckbill valve has its respective intake portion positioned adjacent respective openings 86, 88 and 90 (FIG. 6) associated with bottom plate member 26 and filter assembly 22 and have their outlet portions communicating with the filter assembly 22 as will be hereinafter further explained. When any one of the pumps 34, 36 and 38 are activated, water is drawn into the present unit 10 through the duckbill valves 80, 82 and 84 and water is then channeled through the filter assembly 22 and through the respective duct members 48, 50 and 52 to propel the present unit in a vertical and/or horizontal direction depending upon which pumps are being activated. The duckbill valves are strategically positioned and located along the bottom surface of the present unit 10 and in communication with the filter assembly 22 so as to collect all debris within its path. Duckbill valve 80 is positioned at the forward portion of the unit 10 substantially perpendicular to the unit's longitudinal axis L and is a larger valve as compared to the two rear duckbill valves 82 and 84 as clearly illustrated in FIGS. 6 and 18. The rear duckbill valves 82 and 84 are angularly oriented as illustrated in FIGS. 6 and 18 so as to overlap the front duckbill valve 80 for more efficient cleaning of the bottom pool surfaces. All three valves 80, 82 and 84 form a continuous path for collecting debris off of the bottom wall pool surface. The rear duckbill valves 82 and 84 can be oriented at any angle between 0° and 90° relative to longitudinal axis of the unit. Water flow suction for the duckbill valves 80, 82 and 84 is provided by the pump assembly 32 illustrated in FIGS. 10-12.

Figure 7:
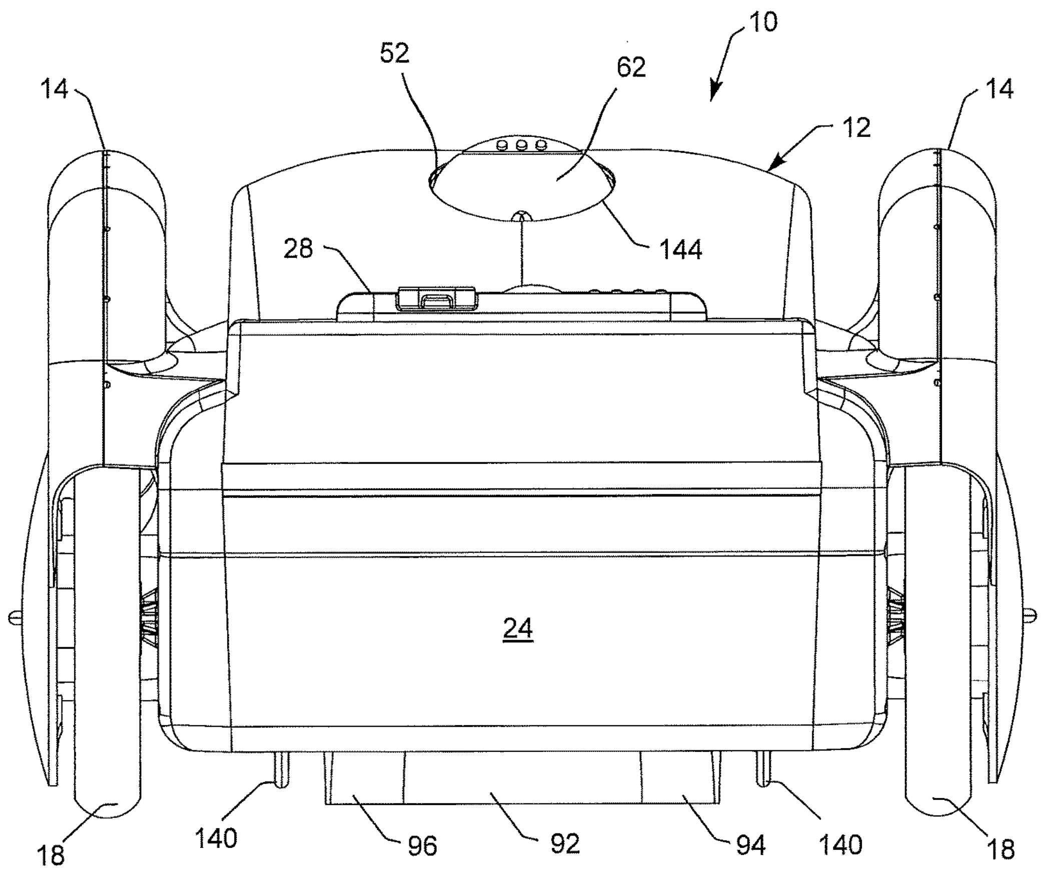
FIG. 7 is a rear elevational view of the apparatus of FIG. 1.
Figure 8:
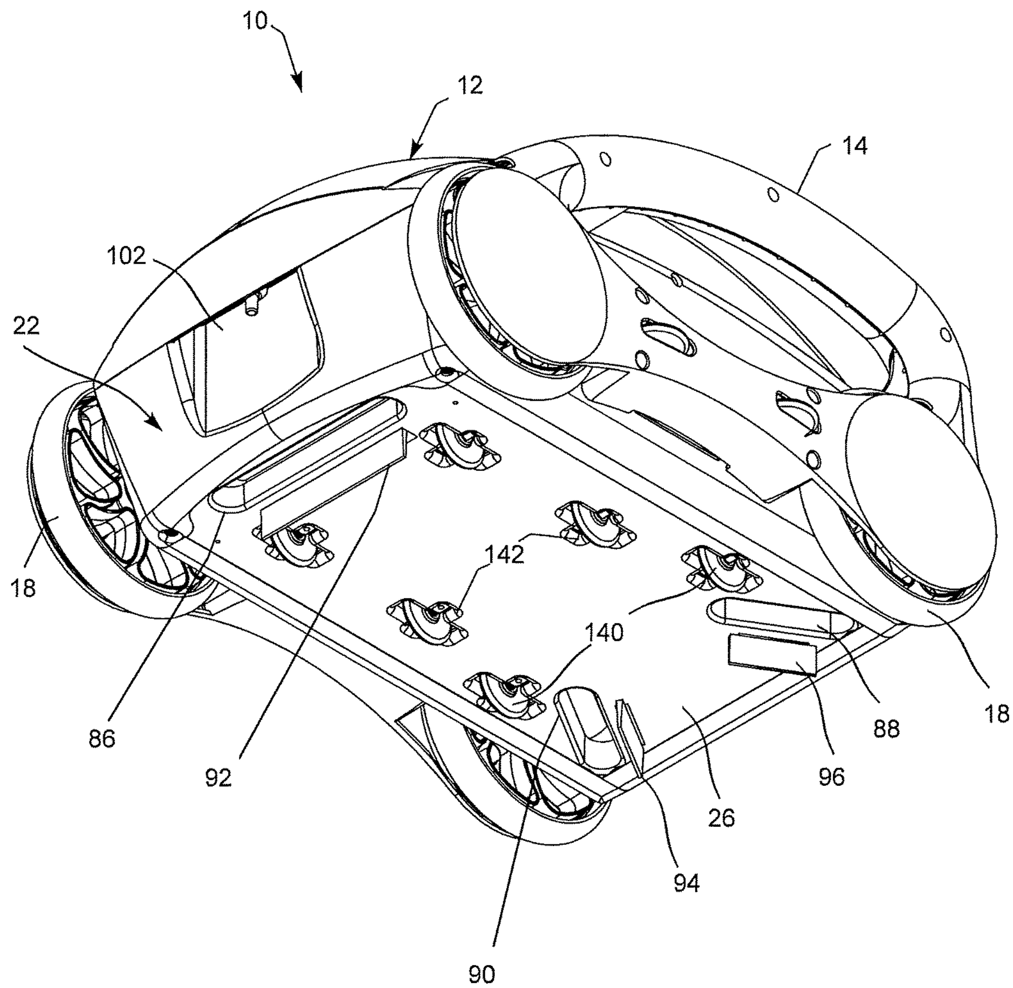
FIG. 8 is another perspective view of the underside portion of the apparatus of FIG. 1 showing the position and location of the duckbill valves, water inlets, their respective wiper members, and the idler wheels associated with the bottom portion of the apparatus.

Each duckbill valve 80, 82 and 84 likewise has positioned adjacent thereto a wiper member such as front wiper member 92 and rear wiper members 94 and 96 as again best illustrated in FIGS. 6-8. These wiper members are positioned parallel to the position and location of their respective duckbill valves so as to function as a funnel, decreasing pressure at the inlets to catch debris off the bottom wall pool surface as the present unit 10 moves along the bottom pool surface. In an alternate embodiment, the wipers extend to reach the pool surface to stop and catch debris and funnel it towards their respective inlet. This ensures that all debris located within the path of the present unit 10 will be sucked up through the respective duckbill valve and filtered through the present unit as will be hereinafter further explained.

Figure 17A:
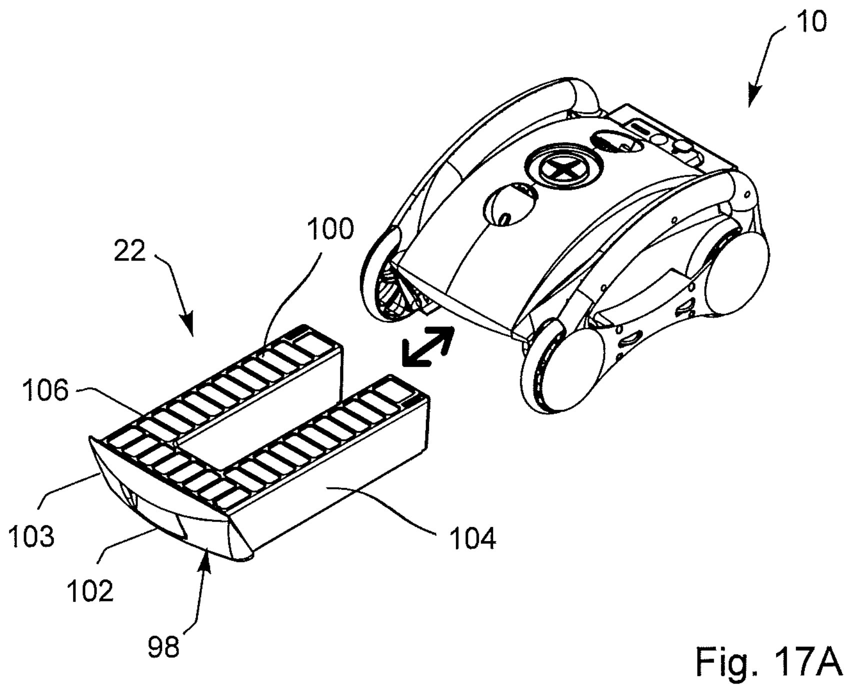
FIG. 17A is a perspective view of one embodiment of a front loading filter assembly removed from the apparatus of FIG. 1.
Figure 17B:
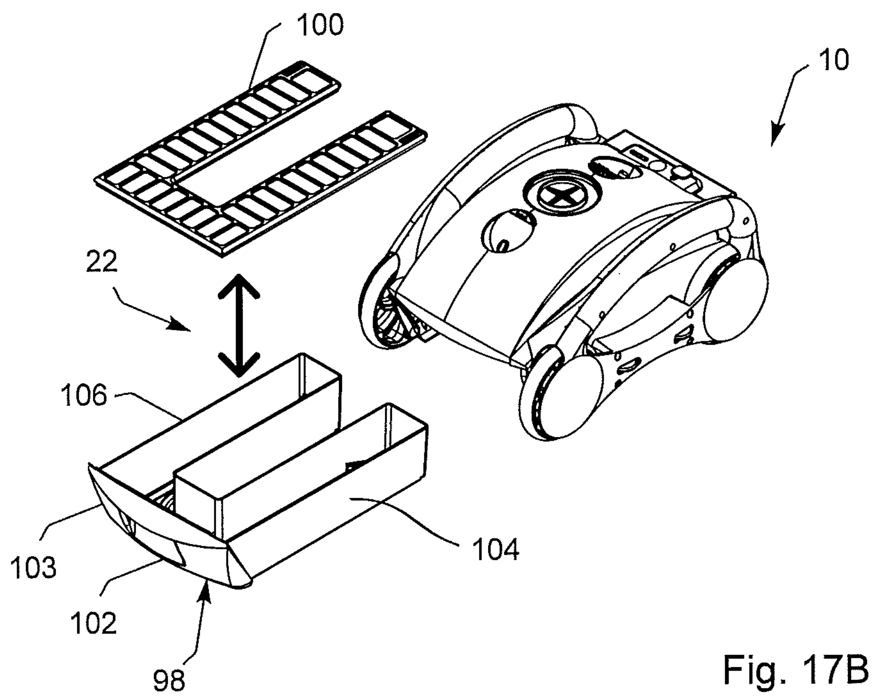
FIG. 17B is an exploded perspective view of the present front loading filter assembly of FIG. 17A showing the top filter mesh material removed from the filter tray.

As best illustrated in FIGS. 17A, 17B and 18, the present unit 10 includes a filter assembly 22, which includes a filter tray 98 and a top filter mesh material member or other suitable filtering device 100, which is slidably insertable into the present unit from the front portion thereof, although insertion from other sides are also envisioned. The filter tray 98 is formed on top of the bottom panel member 26 as best illustrated in FIG. 18 and is substantially u-shaped in configuration and also forms the lower adjacent portion of at least one of the front, rear, left and right side portions of the body structure. The u-shaped filter tray 98 includes parallel side portions 104 and 106 each having a respective opening 108 and 110 formed at the bottom for receiving the inlet end portion of each respective rear duckbill valves 82 and 84 and a connecting front portion 103 having an opening 112 for receiving the inlet end portion of the front duckbill valve 80 as best illustrated in FIG. 18. As such, when any one or more of the pumps 34, 36 and/or 38 are activated, the impellers 42 associated with the respective pumps cause water to be pushed upwards. This water flow causes water suction in through the respective duckbill valves 80, 82 and 84 which receive water and debris from the pool bottom wall surface under the present unit 10. Water and debris then pass through the respective duckbill valves 80, 82 and 84 and exits through the outlet portion of the valves into the filter tray 98. The water then continues upward through the top filter mesh material or screen 100 and out through the respective discharge duct members 48, 50 and/or 52. This action draws the debris from the bottom wall surface of the pool into the filter tray 98 and collects the debris within filter tray 98 since the top filter mesh material 100 prevents the debris from exiting filter tray 98. As the present unit 10 moves back and forth across the bottom wall pool surface as will be hereinafter further explained, debris is collected within the filter assembly 22 and is filtered from the water received by the duckbill valves before the water exits the filter assembly. The filter tray 98 includes a handle member 102 for easily grasping the filter assembly 22 and removing the same from unit 10 when the cleaning cycle is complete and when the present unit is floating in the water as will be hereinafter further explained.

Figure 19:
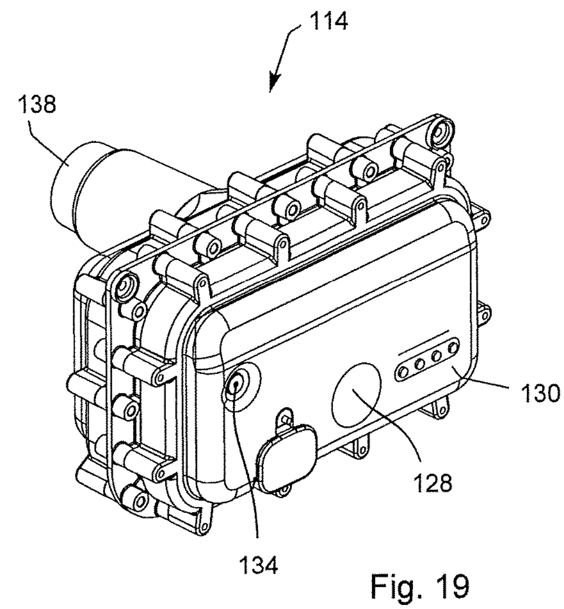
FIG. 19 is a perspective view of one embodiment of a control box subassembly which houses the power source and electronics associated with the apparatus of FIG. 1.
Figure 20:
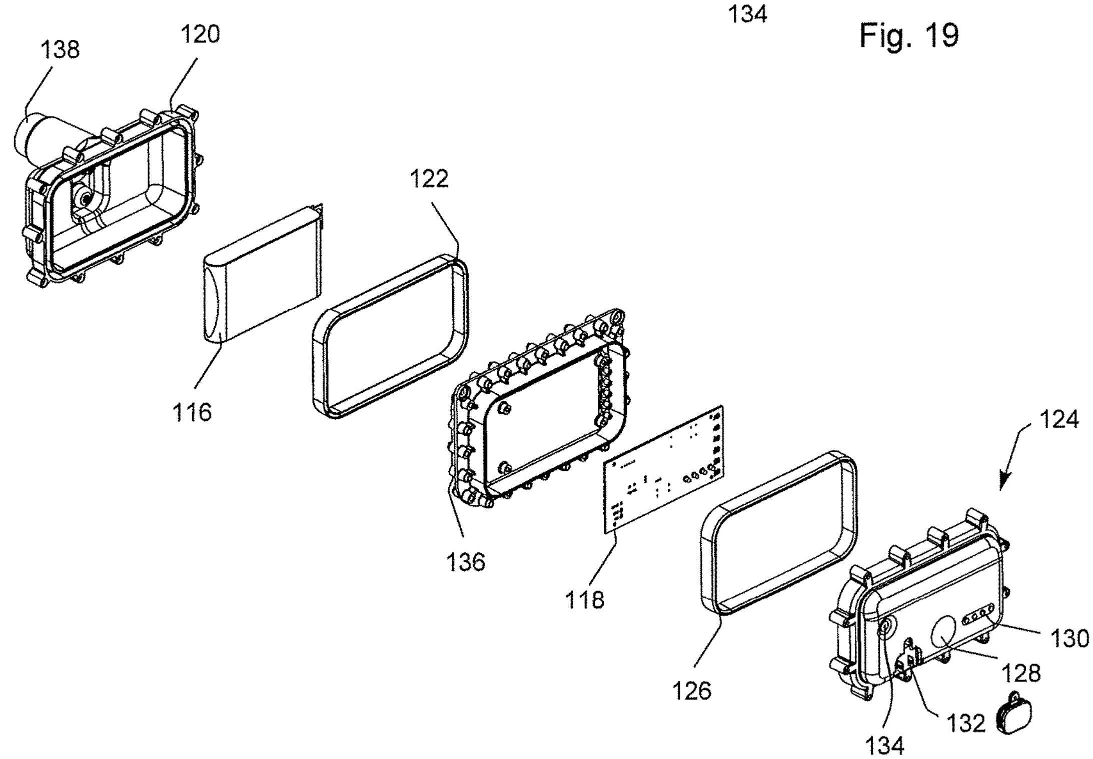
FIG. 20 is an exploded perspective view of the control box of FIG. 19.
Figure 21:
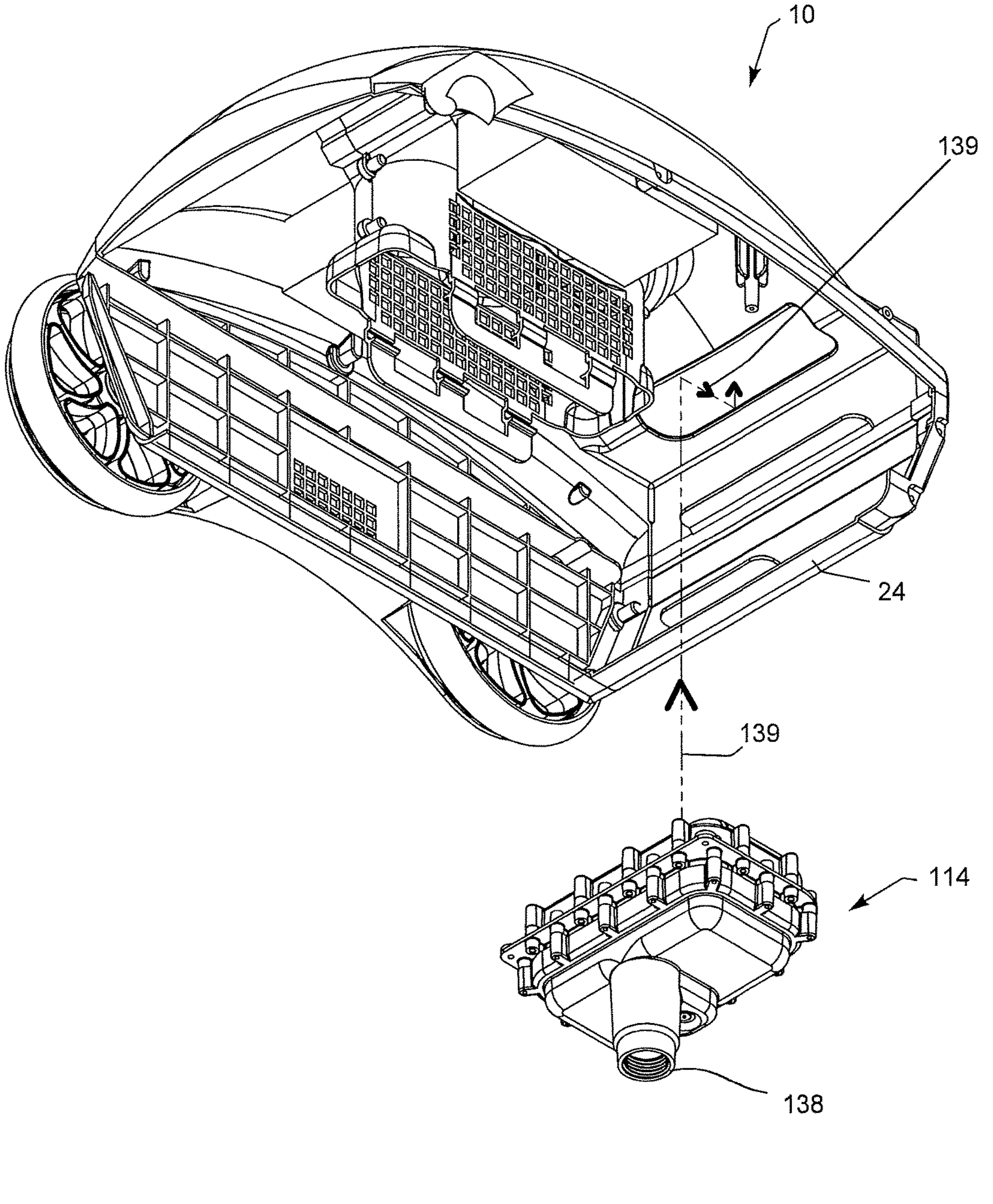
FIG. 21 is an exploded perspective view showing installation of the control box of FIGS. 19 and 20 into the apparatus of FIG. 1.

FIGS. 19, 20 and 21 illustrate one embodiment of a control box 114 which houses both the power supply and the electronics associated with the present device. As best illustrated in exploded FIG. 20, control box 114 includes power source 116 which may include at least one rechargeable battery for supplying power to the pumps 34, 36 and 38 as well as the PC board 118 which includes the main controller, a plurality of sensors and other electronic circuits as will be hereinafter further explained for controlling the operation of the pumps 34, 36 and 38. The rechargeable battery 116 may be a NiMH (nickel-metal hydride), lead acid, NiCad, lithium ion or other known or yet to be discovered rechargeable battery or other rechargeable power source and is housed within a battery enclosure 120 which is sealed with a battery gasket 122 and separating plates 136, although other methods of sealing, such as ultrasonic welding, are also envisioned. It is recognized and anticipated that a wide variety of battery components may be used with the present invention and the particular member and arrangement will vary according to the types of batteries used, power requirements of the unit, weight consideration, battery life and other factors.

Figure 5:
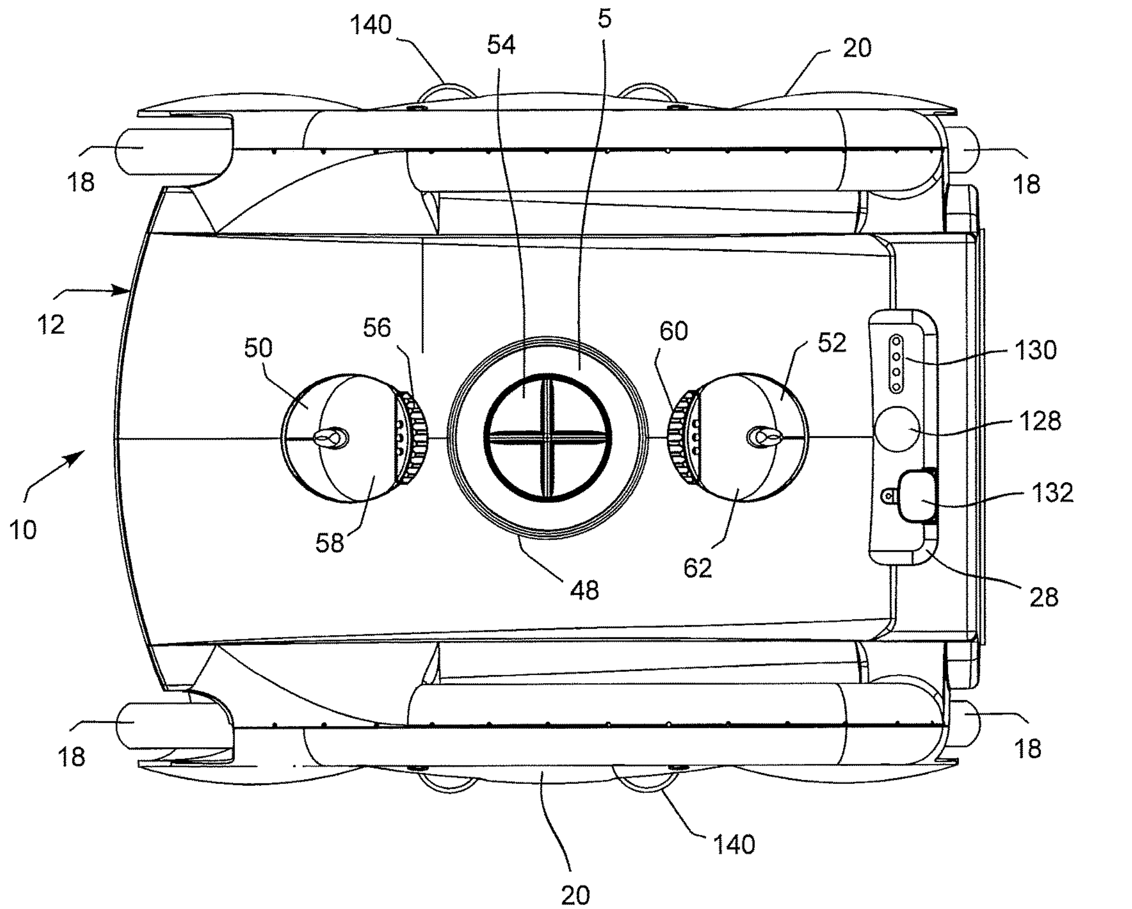
FIG. 5 is a top plan form view of the apparatus of FIG. 1.

The PC board 118 is in electrical communication with the battery 116 for powering the same and is housed within a main PC board enclosure 124 which is likewise sealed with a gasket 126 and separating plate 136, although other methods of sealing, such as ultrasonic welding, are also envisioned. The PC board enclosure 124 includes a start button 128 in electrical communication with the PC board, a display window 130 for exposing a plurality of LED lights, in this embodiment, also in communication with the PC board for showing the battery charge level associated with rechargeable battery 116 along with other user interface outputs, a charger port 132 in communication with the PC board and a gas pressure relief valve 134. The battery 116 and the electronics 118 are separated and isolated from each other by a separating plate 136 which may also act as a heat sink. All of the components illustrated in FIG. 20 are housed within the control box 114 which is easily positioned and housed within the body structure 12 as best illustrated in FIG. 21. The control box 114 includes an electrical connection port 138 which is adapted for receiving the electrical connector 46 associated with pump assembly 32. This connection is clearly shown in FIG. 12. As best illustrated in FIG. 21, the control box 114 is rotated so as to be positionable within the body structure 12 as indicated by the arrows 139 such that the control box 114 is positioned as illustrated in FIG. 12 with the start button 128, the display and lights 130, and the charge port 132 all exposed and operatively accessible on interface panel 28 as best shown in FIG. 5. Control box 114 is mounted into the overall assembly by methods commonly known to those skilled in the art, such as snap fits, screws, etc., and is a second major subcomponent of the present device 10 which is easily removable for maintenance, replacement of parts such as battery 116, or upgrades to the present design.

The present device 10 likewise includes a plurality of idler wheels 140 located on the bottom portion of the present device 10 as best illustrated in FIGS. 6 and 8 as well as on the side portions of the present device 10 as best illustrated in FIGS. 1-8. Bottom idler wheels 140 freely rotate on respective axles 142 and help keep the unit 10 moving along the bottom wall pool surface. The side idler wheels 140 likewise keep the present unit 10 moving in a forward or rearward direction when the unit 10 comes into contact with a side wall associated with the particular pool or other body of contained water. This prevents a stoppage of the unit due to frictional forces if the entire side portion of the unit engages a particular side wall of the pool. All of the wheels associated with the present unit 10 including all of the idler wheels 140 as well as the main forward and rear wheels 18 are free floating and are not powered by any means. The present unit 10 is propelled solely by the water jet pump assembly 32 as will be hereinafter further explained.

The lid member 16 is attached to or otherwise molded as part of the frame assembly 12 and includes a plurality of openings 144 spaced side by side for registration with the discharge duct members 48, 50 and 52 associated with the duct assembly 47 and the water jet pump assembly 32 which is receivable therewithin. The openings 144 are covered by the baffles 56 and 60 and the center cap member 55. The filter assembly 22 is easily removable to provide access to the pump assembly 32 and other interior components associated with the present unit 10.

Figure 22:
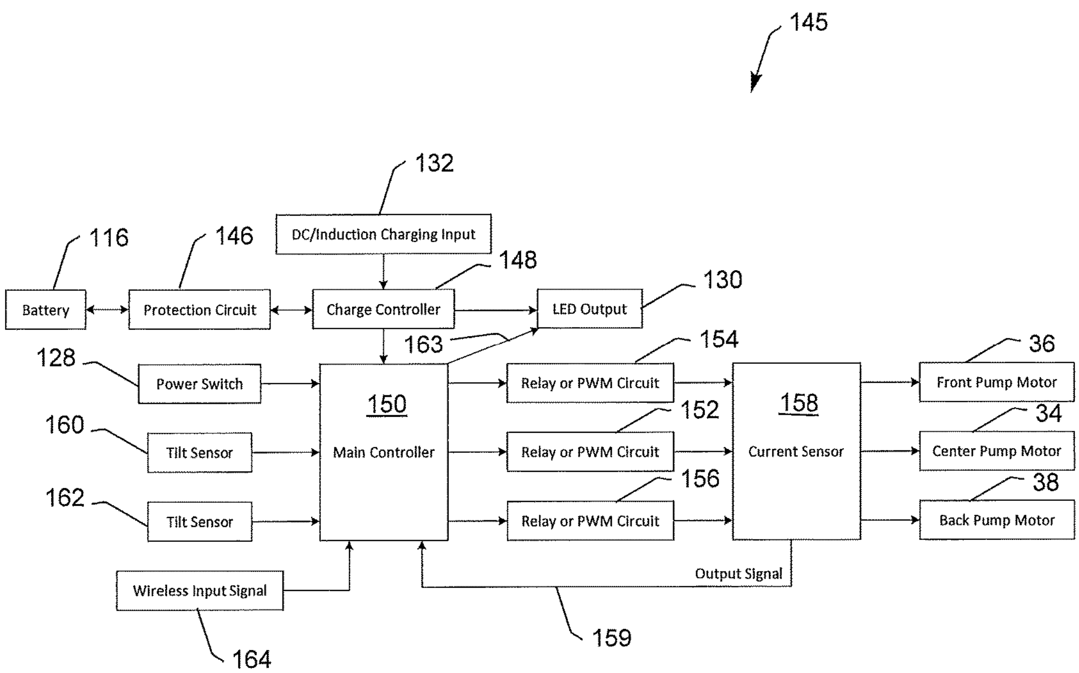
FIG. 22 is a simplified block circuit diagram showing one embodiment of the various electronics and sensors associated with the apparatus of FIG. 1 connected to the respective pump motors.

FIG. 22 is a simplified block circuit diagram 145 of one embodiment of the electrical components associated with the present unit 10. These components act to control the pump assembly 32 and the individual pump motors associated with pumps 34, 36 and 38. Some of the components shown in FIG. 22 may be located on the PC board 118, in the battery housing 120, or may be components in addition to the components housed in the control box 114. As illustrated in block diagram 145, the power provided by the battery 116 passes through a battery protection circuit 146, which circuit is likewise connected to a charge controller 148 which enables the charge port 132 associated with control box 114 to charge the battery 116. Charging the battery 116 is accomplished through charge port 132 by connecting an external charging plug to the port 132 for recharging the battery. A DC power source can be connected to the charging port input 132 in a conventional manner. When charged, the battery 116 powers all of the operational requirements of the present cordless unit 10. It is also recognized and anticipated that such charging can be accomplished by induction charging which is also well known in the art.

The battery status indicators, as part of 130, are likewise coupled to the charge controller so as to show the charge status of the battery 116 at any time during operation of the unit 10. The main controller 150, in at least one embodiment, controls the operation of the three pumps 34, 36 and 38 through respective relay or PWM (pulse width modulated) circuits 152, 154 and 156. One or more current sensors 158 monitor current flow to the respective pump motors and provide feedback to the main controller 150 along conductive path 159 as will be hereinafter further explained. The current sensor 158 will measure the current draw associated with the respective pumps and, based upon lookup tables or programming stored within the memory of the main controller 150, the main controller will shut down or activate certain pump motors to either ensure consistent operation amongst all pump motors to ensure consistent speed, or to prevent damage to the pumps or other components as will be further explained. The current sensor can also be used to determine if any air is being drawn into the system which aids in determining if the robot is proximate to the water surface. When air enters the system and surrounds the impeller, the current required to spin the impellers will decrease and the torque required to spin the impellers will decrease. Even minute amounts of air can cause a lower current draw and the current sensor will be able to detect it.

The main controller 150 may include one or more computer processors, computer memory, input and output ports and is configured to communicate by various communication links with the operational relays 152, 154, and 156, the current sensor 158, the tilt sensors 160 and 162, the power switch 128 and, in an alternative embodiment, wireless input 164.

Tilt sensors 160 and 162 determine if the apparatus 10 is in a tilted state such as when inclined relative to a swimming pool vertical wall. Tilt sensors 160 and 162 are well known in the industry and sense tilt with respect to a single axis, or multiple axis. In one embodiment, tilt is measured with respect to the flat portion of the bottom surface of the pool. Tilt sensor 160 is specifically designed to detect if the present unit 10 is tilted forward or reverse up in the forward or backward direction of movement of the unit 10. In other words, as the unit is moving in a path across the bottom surface of the pool, it will eventually encounter a side wall of the pool. When this occurs, the unit 10 will attempt to drive up the wall causing the unit to tilt upwards either in the forward or rearward direction. Tilting may also occur if the unit 10 hits an obstacle in the pool such as a pool step, a pool drain valve or other obstacle. When an upward tilt is sensed in a forward or backward direction by sensor 160, a signal is sent to main controller 150 which in turn will send a signal to any one or more of the pump motors to shut off or activate a particular pump in order to alleviate the tilt situation and to drive the unit 10 back down the wall to a level position. Based upon programming stored in the memory of the main controller 150, or elsewhere, the controller 150 will select and execute the appropriate program to correct the tilt situation.

Tilt sensor 162 is designed to detect a side-to-side tilt which may occur if the unit is running parallel to a side wall and, for some reason, is tilted in a sideward direction relative to a pool wall, or if the unit again hits an obstacle in the pool. Here again, tilt sensor 162 will detect the side-to-side tilt and will send a signal to the main controller 150 which, in turn, will again send a signal to the appropriate pump motor(s) to again correct the tilt situation and return the unit to a level orientation based upon programming stored in memory and executed by the main controller. Tilt sensors 160 and 162 can be set to detect various angles of inclination such as 10°, 20°, 30°, etc. depending upon the type and size of the bottom pool surface and any inclinations associated therewith such as a steeply sloped or fully vertical pool wall, or a more gently sloping pool surface extending between the deep and shallow ends of the pool.

Power switch 128 is coupled to the main controller 150 and functions as an on/off switch for activating or deactivating the present device 10. In an alternate embodiment, the main controller 150 can also receive a wireless input signal 164 from a remote controller as will be hereinafter further explained to remotely control the present unit 10 and the main controller can control and send signals via conductive path 163 to activate any other LED outputs or other indications deemed necessary for monitoring the control of the unit 10 including, but not limited to, error messages, wireless/Bluetooth connectivity and/or confirmation of user inputs.

A startup program, a submersion program, a cleaning program, and a check robot condition program can be programmed into the memory associated with the main controller 150 as will be hereinafter further explained. It is also recognized and anticipated that other programs and routines can likewise be programmed into controller 150, or other memory means, for reasons including, but not limited to, the size and shape of the particular pool in which the unit will be used for cleaning purposes. The main controller 150 is operable to execute any one or more of these programs for controlling movement of the unit 10 in a body of water. The present rechargeable robotic pool cleaning apparatus 10 can be utilized in the following manner.

A user will start by selectively adjusting the front and rear baffles 56 and 60, flap valves 58 and 62, and/or the front and rear nozzle members 66 both horizontally, vertically, and rotationally using the scroll wheel type rollers indicated by arrows 64, 68 and 70 so as to alter the lateral turning radius of the overall unit 10. Depending upon the size and shape of the particular pool in which the unit 10 will be used, positioning the front and rear baffles and/or exhaust members will enable the present unit to progress in a generally straight or curved path during normal operation depending upon where the baffles 56 and 60 and/or exhaust nozzle members 66 are actually positioned. As explained above, the jet stream of water exiting the flap valves 58 and 62 and/or nozzle members 66 will have both a vertical thrust component and a forward or rear thrust component and if the baffles and/or nozzle ports are angularly oriented relative to the longitudinal axis L of the unit, a sideward thrust component is likewise available. A user will have to experiment with the outflow angles and settings associated with the front and rear exhaust nozzle members 66, or the positioning of the baffles 56 and 60 in order to create the ideal cleaning pattern for the bottom surface of the user's particular pool. In this regard, the present unit 10 can be operated with or without the exhaust nozzle members 66 as previously explained.

Figure 23:
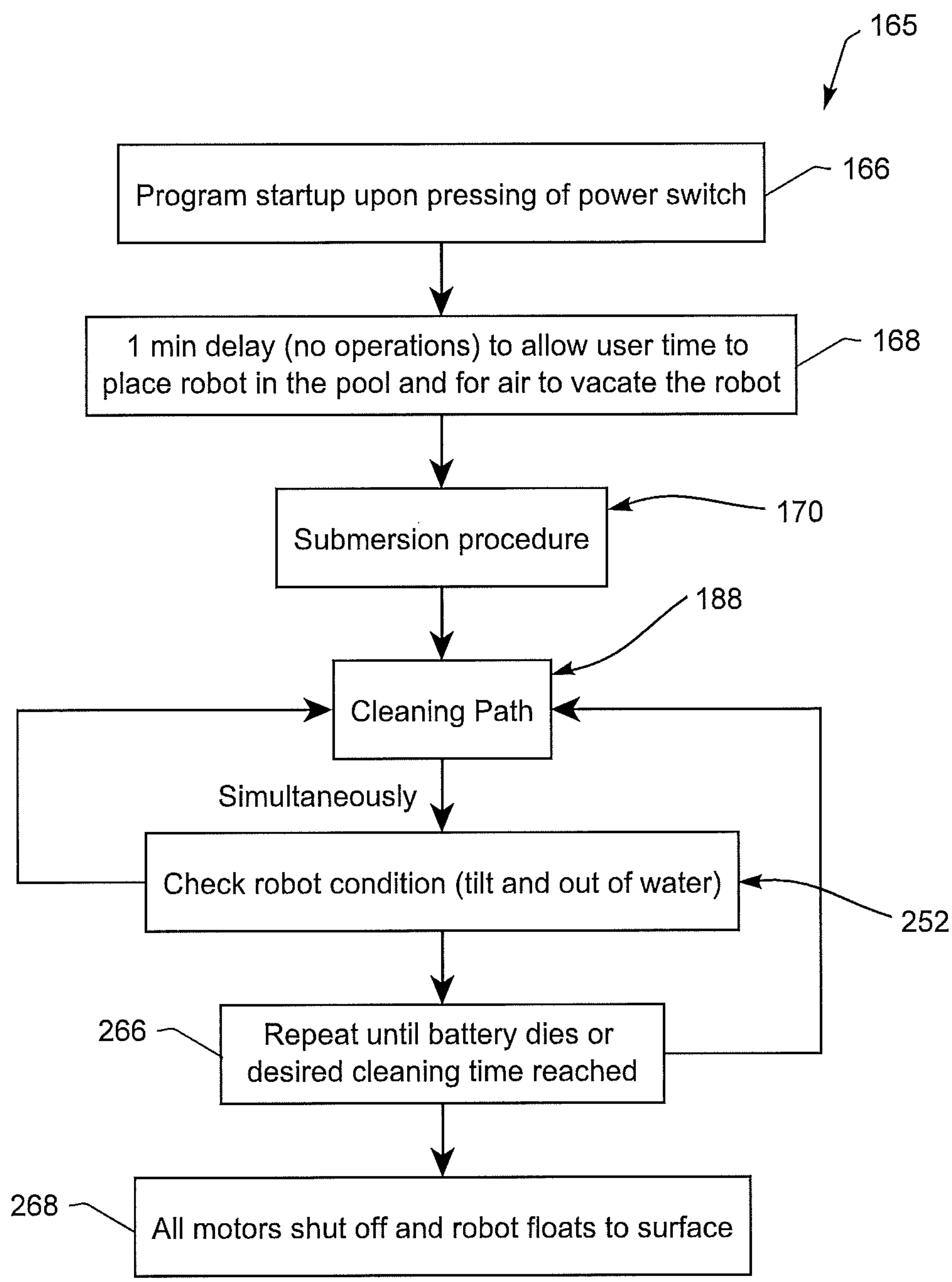
FIG. 23 is a flowchart illustrating one embodiment of a simplified main program associated with the apparatus of FIG. 1 and its relationship to other stored programs.

Once the front and rear baffles 56 and 60, or the front and rear nozzle members 66 have been selectively adjusted, a user will activate the unit 10 by depressing the main power switch 128. The user then sets the unit 10 into the pool and activation of the power switch will activate the start-up program 165 illustrated in FIG. 23. FIG. 23 is a flowchart illustrating one embodiment of a method of operating the present apparatus.

More particularly, when the power switch is activated at step 166, a predetermined delay such as a one minute delay is activated in step 168 in order to allow a user time to place the present unit 10 into the pool and for air to vacate the unit. Since the present unit 10 is buoyant, once the user sets the machine into the pool of water, any air trapped inside the unit 10 will be evacuated through the top center one-way flexible valve 54. Once this one minute delay, or any other predetermined time delay, has expired, the submersion procedure program 170 will be automatically activated.

Figure 24:
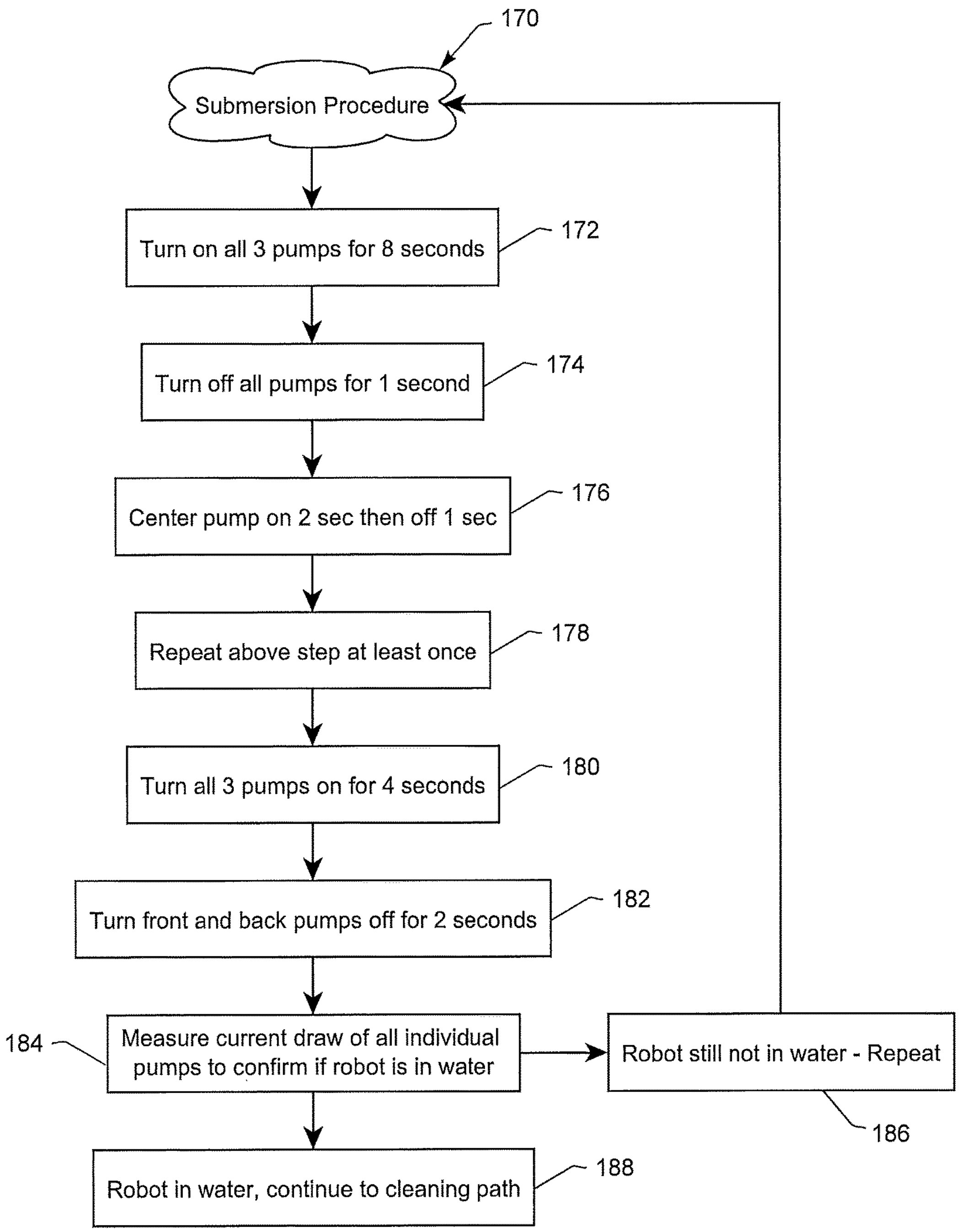
FIG. 24 is a flowchart illustrating one embodiment of the submersion procedure associated with the apparatus of FIG. 1.

FIG. 24 is a flowchart 170 of one embodiment of a submersion procedure. Once the time delay has expired, all three pumps 34, 36 and 38 are activated at step 172 for a set period of time such as for 8 seconds sending a jet stream of water through all three duct members 48, 50 and 52. The center pump 34 provides a first jet stream of water through conduit member 48 in an upward vertical direction thereby resulting in a corresponding pressure or thrust force in a downward direction which pushes the apparatus 10 solely in a downward direction towards the bottom pool surface. Since the front and rear pumps 36 and 38 provide water flow through the angularly oriented conduit members 50 and 52, and since either the baffles 56 and 60 and/or the front and rear exhaust nozzle members 66 are selectively angularly positioned, the water flow exiting flap valves 58 and 62 and/or nozzle members 66 will have both an upward trajectory component as well as a forward, rear and possibly a sideward trajectory component. Depending upon the positioning of the baffles 56 and 60 and/or the nozzle members 66, the corresponding downward thrust vector component will further contribute to pushing the apparatus 10 towards the bottom pool surface whereas the forward, rear and possibly sideward thrust components may either cancel each other out or may provide some forward, rear or sideward thrust component as the apparatus 10 submerges to the bottom pool surface. Here again, the predetermined times established in step 172 through step 182 can be varied to ensure that the unit 10 will reach the bottom pool surface depending upon the depth of the pool.

At step 174 in the submersion procedure 170, all three pumps 34, 36 and 38 are turned off for a predetermined period of time such as for one second. This allows any air still trapped in the unit 10 to escape through the center exhaust valve 54 and water to pool on top of the top recess 57. After this time delay, at step 176, only the center pump 34 is turned on for a predetermined period of time such as 2 seconds and then the center pump is turned off for a predetermined period of time such as one second. This step helps to purge out any remaining air and positions the robot slightly below the water surface. This process is repeated at step 178 for at least one cycle and at step 180, all three pumps are again turned on for a set period of time such as for 4 seconds. After expiration of the predetermined time period in step 180, the front and rear pumps 36 and 38 are turned off at step 182 for a set period of time such as 2 seconds keeping the center diving pump 34 on. This should allow the unit 10 to continue to proceed until it reaches the bottom pool surface. Here again, the predetermined time established in step 172 through step 182 can be varied to ensure that the unit 10 will reach the bottom pool surface depending upon the depth of the pool.

At step 184, current sensor 158 measures the current draw of all individual pumps in order to confirm if the robot 10 is in the water and outputs a signal to the main controller 150 indicative of the respective current draws. If, for some reason, the present unit 10 is not yet positioned in the water, the current draw associated with the pumps in operation will be low since the corresponding impellers are, at least in some proportion, moving air thereby reducing the torque needed for the respective pump motor to operate. This in turn lowers the current draw of the operating pump. If, on the other hand, the unit 10 is in the water, the current draw of the operating pumps will be higher as more torque is needed to push the water through the system and out the respective conduit member. These predetermined current draws can be stored and programmed into the main controller 150 and the main controller will compare the measured current draw to the stored valves in memory for current draw in and out of the water in order to determine the status of the unit 10.

If at step 184, the current draw of the operating pumps is low indicating that the robot unit 10 is still not in the water, the current sensor 158 will output a signal to the main controller 150 indicative of the respective current draw and the main controller will then output a signal in response thereto to repeat the entire submersion procedure 170 at step 186 and the controller will loop back and return to step 172. If, on the other hand, the current draw of the operating pumps is high and confirms that the robot unit 10 is in the water, the main controller 150 will then send a signal in response to the signal received from the current sensor 158 to activate the cleaning path procedure at step 188. This pulsing of the respective pumps 34, 36 and 38 as set forth in the submersion procedure illustrated in FIG. 24 facilitates removal of any remaining trapped air in the device 10 that may alter the performance of the unit under water. This also adds water to the top recess 57 associated with the center exhaust valve 54, where the additional water helps to initially push the unit 10 down to the bottom pool surface. It is also recognized that the center pump 34 is specifically designed so as to be able to hold the present unit 10 down onto the bottom surface of the pool while providing at least the necessary thrust in order to achieve this end over an interval of time related to the lifespan of the battery so as to keep the unit proximate to the pool bottom surface during the entire cleaning process.

Figure 25:
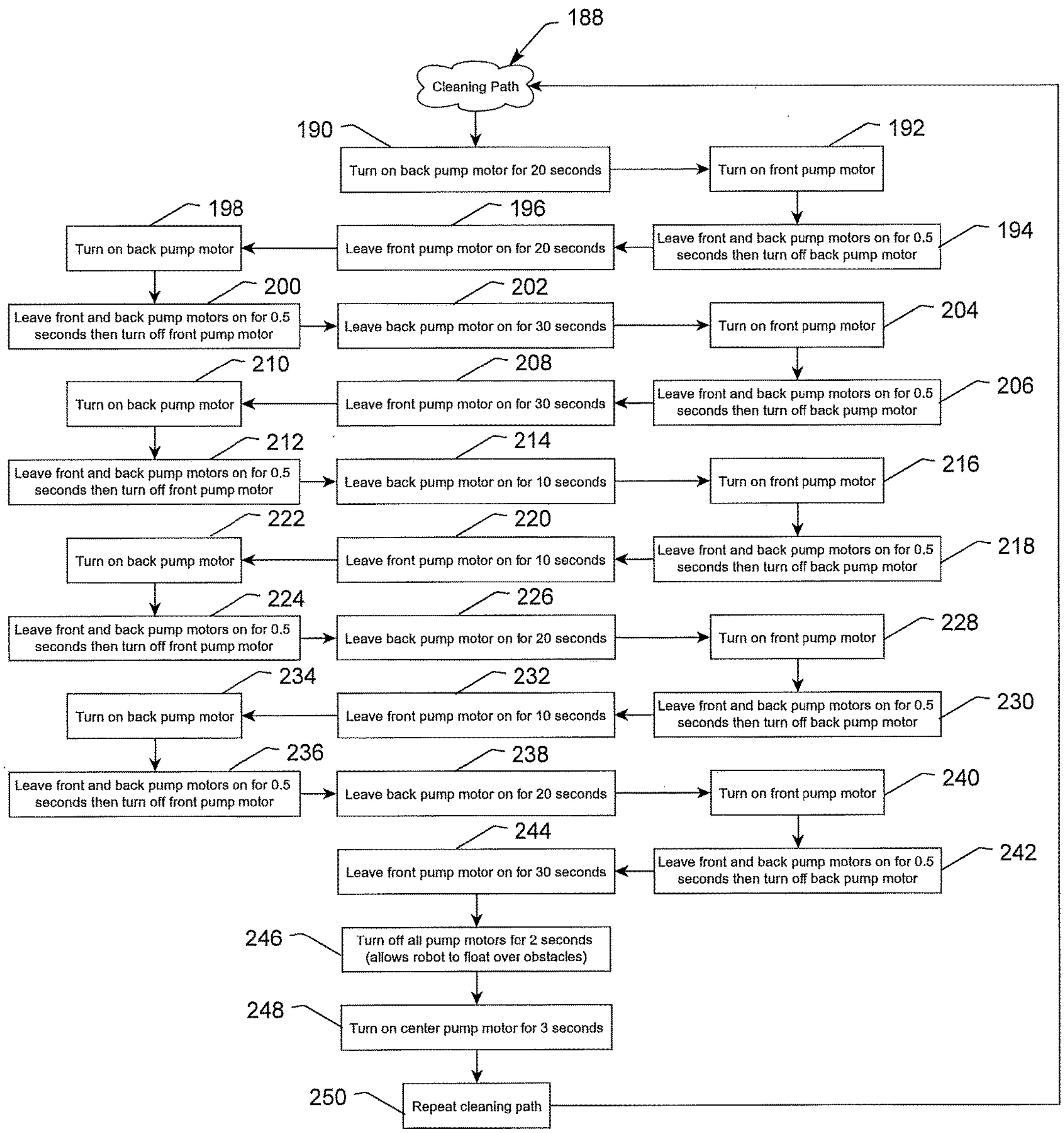
FIG. 25 is a flowchart illustrating one embodiment of a cleaning path procedure associated with the apparatus of FIG. 1.

FIG. 25 is a flowchart 188 illustrating one embodiment of a method of operation for cleaning the bottom surface of a pool or other contained body of water. Once the cleaning process is started, the rear pump motor 38 is activated at step 190 for a predetermined period of time such as for 20 seconds. Activating the rear pump motor moves the unit 10 in a forward direction since the jet stream of water exiting the rear duct member 52 has both a downward thrust component and a forward thrust component which contributes to both holding the unit 10 on the bottom surface of the pool while also providing movement in the forward direction. In step 192, the front pump 36 is activated and at step 194 both the front and back pump motors remain on and overlap each other for 0.5 seconds before the back pump motor 38 is turned off. At step 196 the front pump motor remains on for 20 seconds thereby providing a thrust vector in the rearward direction. This reverses the unit 10 on the bottom pool surface and starts the robot 10 back in the opposite direction. At step 198, the back pump motor is turned on and at step 200 the front pump motor is turned off after a 0.5 second overlap with the back pump motor. At step 202, the back pump motor remains on for a predetermined period of time such as for 30 seconds thereby again reversing the direction of the unit 10 along the bottom pool surface. The software continues to reverse direction with 0.5 second overlaps for a predetermined number of times. For example, at step 204, the front pump motor is turned on and at step 206 the back pump motor is turned off after a 0.5 second overlap with the front pump motor. At step 208 the front pump motor remains on for another 30 seconds and again reverses the direction of movement of the robot. At step 210, the back pump motor is turned on and at step 212, the front pump motor is turned off after a 0.5 second overlap with the back pump motor. At step 214, the back pump motor remains on for 10 seconds and at step 216 the front pump motor is turned on. At step 218, the back pump motor is turned off after an overlap of 0.5 seconds with the front pump motor and at step 220 the front pump motor remains on for 10 seconds. This again reverses the direction of the robot 10 along the bottom pool surface. At step 222, the back pump motor is turned on and at step 224 the front pump motor is turned off after a 0.5 second overlap with the back pump motor. At step 226, the back pump motor remains on for 20 seconds and at step 228 the front pump motor is again turned on and at step 230 the back pump motor is turned off after an overlap of 0.5 seconds with the front pump motor. At step 232, the front pump motor remains on for 10 seconds and at step 234 the back pump motor is again turned on. At step 236, the front pump motor is turned off after an overlap of 0.5 seconds with the back pump motor and at step 238 the back pump motor remains on for 20 seconds. At step 240, the front pump motor is turned on and at step 242 the back pump motor is turned off after an overlap of 0.5 seconds with the front pump motor. At step 244, the front pump motor is turned on for 30 seconds.

As can be seen from the cleaning procedure flowchart 188, step 190 through step 244 turn the front and rear pump motors on and off for predetermined periods of time thereby allowing the unit to move back and forth in a horizontal direction across the bottom surface of the pool or other contained body of water which is being cleaned by the present device 10. It is recognized that the times set forth in flowchart 188 can be changed and varied depending upon the size and shape of the pool and different time cycles can be programmed into flowchart 188 and main controller 150 based upon a particular application. It is also recognized that through the use of a wireless signal, the times could be further changed and varied based on user inputs. It is even further recognized that depending upon the positioning of baffles 56 and 60, and/or nozzle members 66, the unit 10 may also have a sideward trajectory associated with its movement back and forth across the bottom surface of the pool.

At step 246 in the cleaning procedure flowchart, all pump motors are turned off for at least 2 seconds thereby allowing the unit 10 to float over known obstacles in the pool such as the bottom pool drain or other fixed structures associated with the bottom surface of the pool, or any other large obstructions that cannot be driven over. Once all pump motors are turned off, due to the buoyancy of the overall device 10, the present robot will begin to float upwards towards the water surface thereby clearing the obstacle. At step 248, the center dive pump 34 is again turned on for a predetermined period of time such as 3 seconds thereby stopping the upward ascent of the present unit 10 and again pushing the unit downward adjacent the bottom pool surface. At step 250, the entire cleaning process is repeated and the controller will loop back to step 188. The cleaning program 188 will then be repeated until the entire bottom pool surface is clean, until the battery dies, reaches a predetermined low charge level, or a predetermined cleaning time has been reached. Again, the charge level of the battery can be continuously monitored during the entire cleaning process by viewing the battery charge display and lights 130 associated with the top interface panel 28.

Figure 26:
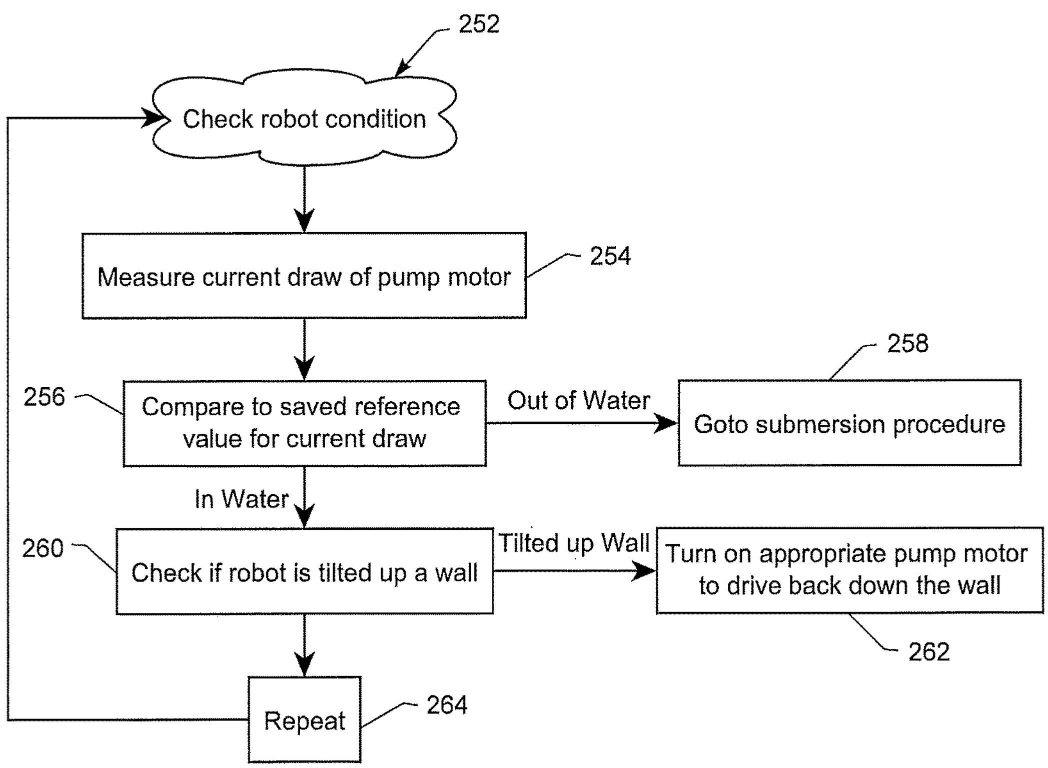
FIG. 26 is a flowchart illustrating one embodiment of a check robot condition program associated with the apparatus of FIG. 1.

Returning to FIG. 23, simultaneously as the cleaning path program 188 is being executed, a check robot condition program 252 is likewise simultaneously activated. FIG. 26 is a flowchart 252 illustrating one embodiment of how the main controller 150 continuously checks the condition of the robot, namely, whether the robot is out of the water, or whether the robot is tilted in any manner. At step 254 in FIG. 26, the current sensor 158 again measures the current draw of the pump motor or motors in operation. This current draw is then compared to saved reference values for current draw at step 256 as previously explained in order to determine if the unit 10 is either in or out of the water. Here again, as previously explained, if the unit is out of the water, the current draw associated with any one or more of the three pumps 34, 36 and 38 which is activated at the time of the measurement will be lower as compared to the current draw of any one or more of the pumps when the unit 10 is in the water. The measured current draw is compared to stored values in memory at 256 and if the unit is out of the water, the main controller 150 at step 258 will send a signal to activate the submersion procedure 170 as illustrated in FIG. 24. If, on the other hand, the main controller determines at step 256 that the present unit 10 is still in the water, the main controller will then check to see if the robot is tilted in any manner relative to a pool wall at step 260. Here again, tilt sensors 160 and 162 communicate with the main controller 150 and will sense when the unit is tilted in any direction. The tilt sensors 160 and/or 162 will then output a signal to the main controller indicative of the tilt status of the unit 10. If the robot 10 is in fact tilted, main controller 150 will then output a signal to turn on the appropriate pump motor at step 262 to drive the unit 10 back down the wall surface as previously explained. At step 264, the entire check robot condition program is again repeated and this program 252 runs simultaneously with the cleaning program 188 until the cleaning program is completed.

Returning back to the flowchart illustrated in FIG. 23, once the cleaning path program 188 is activated, at step 266, the check robot condition program 252 will run simultaneous with the cleaning path program 188 until either the battery dies, a predetermined low battery charge level is reached, or the desired cleaning time associated with cleaning program 188 is reached. If any of these conditions occur, namely, the battery dies or reaches a predetermined low battery charge level, or the desired cleaning time has been reached, the main controller 150 will output a signal to all three pumps 34, 36 and 38 to shut off all pump motors at step 268 and the present unit 10 will float to the water surface.

It is recognized and anticipated that all of the timing associated with the various flowcharts including the startup procedure illustrated in FIG. 23, the submersion procedure illustrated in FIG. 24, and the cleaning path procedure illustrated in FIG. 25, can all be changed and the order in which the front and rear pump motors and the main center diving pump are turned on and off can likewise be varied depending upon the size and shape of the pool to be cleaned. It is also recognized and anticipated that the order in which the programs are executed and that additional programs can be varied and added to the main controller 150 in order to accommodate particular applications. Still further, additional controllers such as controller 150 and additional memory can be added to the electronics 144 associated with the present device 10 again depending upon the particular application. The terms "wireless" and "cordless" and their synonyms, are considered equivalent for the purposes of this disclosure.

Once the present device 10 has completed the cleaning cycle, or the battery has either died or reached a predetermined low battery level, the present device 10 will float to the water surface as indicated in step 268 of FIG. 23. Once the device reaches the water surface, a user can either retrieve the present device 10 manually or, in an alternate embodiment, a user may activate a remote control device which will send a signal to the wireless input signal port 164 for coercing the unit 10 to move in a forward or reverse direction to reach one edge of the pool for retrieval of the unit. The remote control device can allow the user to activate the front or rear pump 36 and/or 38 to move the unit 10 in a forward or reverse direction. Selective operation of the front or rear pumps will keep the present device 10 floating on the water surface while allowing the unit to move towards one edge of the pool. Once the unit 10 reaches a side wall of the pool, a user need not immediately pull the unit out of the water. Instead, a user may retrieve the debris collected in the filter assembly 22 by grabbing the handle 102 and pulling the filter tray 98 out of the front portion of the device 10, although retrieving the filter assembly from other sides of the body structure is also envisioned. Once removed from the unit 10, the filter screen 100 can be removed and the debris from tray 98 can likewise be removed. By removing the filter assembly 22 before the rest of the unit 10 is removed from the water surface, virtually no water is retained inside the unit and therefore no water is removed from the pool. The unit 10, without the filter assembly 22, can then be removed from the pool, the filter assembly can then be reattached to the unit, and the unit can then be charged via charge port 132. Once charged, the unit is again ready for operational use. Although a DC power source can be connected to the DC charging input 132 in order to charge the battery 116, it is also recognized and anticipated that induction charging may likewise be utilized for the charging process. Induction charging is well known in the art and this can be accomplished both in and out of the water. If in the water, an induction coil can be tied into any AC and/or DC source.

It is important to recognize that the overall construction of the present unit 10 has two major subcomponents, namely, the pump assembly 32 and the control box 114. Both of these subassemblies are snap fitted into the overall body structure 12 of the present unit and both are easily removed for maintenance, upgrades or replacement. Almost all of the wearable components associated with the present unit 10 are housed within these two major subcomponents and these are the only major components that a user may need to upgrade or replace during the lifetime of the unit 10. By undoing certain screws, snap features, or any of the like known to those skilled in the art associated with the present unit, these components are easily disconnected from each other by removing connector 46 from connecting port 138 and such components may then be easily replaced with more upgraded versions or replacement parts as needed thereby making the present device 10 extremely user friendly.

It is also recognized that the present device 10 is particularly adaptable for use in cleaning the bottom pool surface of above ground pools, inground pools, fountains and other contained bodies of water having side walls. The ability to adjust the outflow angles associated with the baffles 56 and 60 and/or the front and rear nozzle members 66 in a simple and efficient manner advantageously allows a user to selectively adjust the tracking of the present unit to cover the bottom wall surface of any particular sized and shaped pool. Also, a simple propulsion system which utilizes only water jet propulsion in combination with a simple valve system and independent selectable and adjustable flow channels eliminates the need for complicated diverter valve flow systems and other complicated valve assemblies and enables a more efficient and simple operation of the present device including a more simple cleaning program to cover the bottom wall pool surface of any particular size and shaped pool. A water removable filter assembly and easy front loading in combination with a buoyant unit that automatically returns to the water surface when the cleaning cycle is completed also improves over the prior art.

Understanding the scope of the present invention, the term "comprising" and its derivatives, as used herein, are intended to be open-ended terms that specify the presence of the stated features, elements, components and/or groups, but do not exclude the presence of other unstated features, elements, components and/or groups. The foregoing also applies to words having similar meanings such as the terms "including", "having" and their derivatives. The terms of degree such as "substantially", "about" and "approximate" as used herein mean a reasonable amount of deviation of the modified term such that the end result is not significantly changed.

Only selected embodiments have been chosen to illustrate the present inventions. The various constructions described above and illustrated in the drawings are presented by way of example only and are not intended to limit the concepts and principals of the present inventions. It is also recognized and anticipated that the size, shape, location and other orientation of the various components and/or elements associated with the present inventions can be changed as needed and/or as desired depending upon a particular application. Components that are shown directly connected or contacting each other can have intermediate structures disposed between them. In addition, the functions of one element can be performed by two elements, and vice versa. The structures and functions of one embodiment can also be adopted in another embodiment. It is not necessary for all advantages to be present in a particular embodiment at the same time. Thus, the foregoing descriptions of the embodiments according to the present inventions are provided for illustration only, and not for the purpose of limiting the inventions as defined by the appended claims and their equivalents.

Thus, there has been shown and described several embodiments of a novel rechargeable robotic pool cleaning device for cleaning the bottom wall surface of a pool or other contained body of water. As is evident from the foregoing description, certain aspects of the present inventions are not limited by the particular details of the examples illustrated herein, and it is therefore contemplated that other modifications, applications, variations, or equivalents thereof, will occur to those skilled in the art. Many such changes, modifications, variations and other uses and applications of the present constructions will, however, become apparent to those skilled in the art after considering the specification and the accompanying drawings. All such changes, modifications, variations and other uses in applications which do not depart from the spirit and scope of the present inventions are deemed to be covered by the inventions which are limited only by the claims which follow.

What is claimed is:

1. A rechargeable autonomous robotic pool cleaning apparatus for cleaning the bottom wall surface of a swimming pool or other contained body of water having a bottom wall surface, side wall surfaces and a water surface, the apparatus comprising:

a body structure having front, rear, top, bottom and side portions, a longitudinal axis and a vertical axis;

a first water jet pump housed within said body structure, said first pump including an impeller for generating a first jet stream of water when activated, said first pump being positioned adjacent to a first discharge duct member, said first discharge duct member being vertically oriented relative to the longitudinal axis of the body structure and parallel to its vertical axis for directing the first jet stream of water vertically upward relative to the body structure;

a second water jet pump housed within said body structure, said second pump including an impeller for generating a second jet stream of water when activated, said second pump being positioned adjacent to a second discharge duct member, said second discharge duct member being angularly oriented relative to the vertical axis of the body structure for directing the second jet stream of water at an outflow angle relative to the vertical axis of the body structure and towards the front portion of the body structure;

a third water jet pump housed within said body structure, said third pump including an impeller for generating a third jet stream of water when activated, said third pump being positioned adjacent to a third discharge duct member, said third discharge duct member being angularly oriented relative to the vertical axis of the body structure for directing the third jet stream of water at an outflow angle relative to the vertical axis of the body structure and towards the rear portion of the body structure;

at least one water inlet formed in the bottom portion of the body structure for receiving water and debris from the swimming pool or other contained body of water;

a pair of freely rotating front wheels and a pair of freely rotating rear wheels associated with said body structure;

a rechargeable power source housed within the body structure for providing power to said first, second and third water jet pumps;

said first water jet pump, when activated, causing water to be drawn into the body structure through the at least one inlet and causing said first jet stream of water to exit through the first discharge duct member thereby providing a downward thrust force pushing the apparatus downward towards the bottom wall surface of the swimming pool or other contained body of water;

said second water jet pump, when activated, causing water to be drawn into the body structure through the at least one inlet and causing said second jet stream of water to exit through the second discharge duct member thereby providing at least a rearward thrust component pushing the apparatus in a rearward direction;

said third water jet pump, when activated, causing water to be drawn into the body structure through the at least one inlet and causing said third jet stream of water to exit through the third discharge duct member thereby providing at least a forward thrust component pushing the apparatus in a forward direction;

said apparatus being buoyant so as to float at the surface of the water when the first, second and third pumps are not activated, said apparatus, when submerged, automatically returning to the surface of the water when said first, second and third pumps are not activated;

whereby said first, second and third pumps can be activated in various combinations to propel the apparatus in both a vertical direction to descend to the bottom wall surface of the swimming pool or other contained body of water and in a horizontal direction along bottom wall surface or the water surface.

2. The apparatus of claim 1 including a one-way flexible exhaust valve positioned and located adjacent the terminal end portion of the first duct member.

3. The apparatus of claim 1 including at least one one-way flap valve positioned and located adjacent the terminal end portion of both the second and third discharge duct members.

4. The apparatus of claim 3 wherein said flap valves are selectively rotatable.

5. The apparatus of claim 1 including a baffle member associated with each of said second and third discharge duct members, said baffle members directing the second and third jet streams of water at a specific angle relative to the vertical axis of the body structure as the second and third jet streams of water exit the second and third discharge duct members.

6. The apparatus of claim 5 wherein said baffle members are selectively adjustable so as to alter the outflow direction of the second and third jet streams of water relative to the vertical axis of the body structure.

7. The apparatus of claim 1 including a selectively attachable nozzle member positioned and located adjacent the terminal end portion of each of said second and third discharge duct members for controlling the outflow direction of the second and third jet streams of water, said nozzle members being adjustable in both a horizontal plane and a vertical plane so as to produce a vertical thrust component, a forward thrust component, a rearward thrust component and/or a sideward thrust component depending upon the positioning of said nozzle members relative to the vertical axis of the body structure.

8. The apparatus of claim 1 including a removable filter assembly slidably insertable into said body structure for collecting debris from the bottom wall surface of the swimming pool or other contained body of water, said filter assembly forming the bottom portion of said body structure, said at least one water inlet in the bottom portion of the body structure being associated with said filter assembly.

9. The apparatus of claim 8 wherein the filter assembly forms at least one adjacent wall of the body structure.

10. The apparatus of claim 1 including a duckbill valve associated said at least one water inlet, said duckbill valve having an intake portion adjacent said at least one water inlet for receiving water and an outlet portion positioned in the filter assembly.

11. The apparatus of claim 8 wherein said filter assembly includes a filter member for retaining any debris collected within the filter assembly as water passes therethrough.

12. The apparatus of claim 1 including at least one freely rotating idler wheel located on the bottom portion of the body structure.

13. The apparatus of claim 1 including at least one freely rotating idler wheel positioned and located on the side portions of the body structure.

14. The apparatus of claim 1 wherein said first, second, and third pumps are positioned and located in a housing forming a pump assembly, said pump assembly being selectively removable from the body structure.

15. The apparatus of claim 1 including electronics housed within the body structure and electrically connected to the rechargeable power source and to the first, second and third water jet pumps for controlling the operation of the pumps, said electronics including at least one main controller, memory for storing operating programs for controlling the operation of the first, second and third pumps for moving the apparatus both vertically and horizontally in the body of water and a charge controller coupled to the power source and to a charging input for charging the power source.

16. The apparatus of claim 14 including at least one current sensor coupled to said at least one main controller for monitoring the current draw associated with each of the first, second and third pumps, said at least one current sensor outputting a signal to the at least one main controller indicative of the current draw associated with any one of the respective pumps, the at least one main controller comparing a measured current draw from any one of the respective pumps to pre-determined stored values in memory and outputting a signal to control the operation of said pumps in response thereto.

17. The apparatus of claim 15 including a submersion program operable by said at least one main controller, said submersion program pulsing the water jet pumps to propel the apparatus downward to the bottom surface of the swimming pool or other contained body of water thereby allowing excess air trapped in the body structure to be forced out of the first, second and third discharge duct members during the submersion process.

18. The apparatus of claim 15 wherein the power source and the electronics are housed in a single assembly, said single assembly being selectively removable from the body structure.

19. The apparatus of claim 18 including a separating plate isolating the power source from the electronics, the separating plate functioning as a heat sink.

20. The apparatus of claim 1 wherein said respective pairs of front and rear wheels include buoyant material.

21. The apparatus of claim 1 wherein said respective pairs of front and rear wheels are at least partially hollow.

22. The apparatus of claim 1 wherein said body structure includes at least one handle member which projects above the surface of the water when the apparatus is floating in the water.

23. The apparatus of claim 1 wherein said second discharge duct member is angularly oriented such that when the second water jet pump is activated, said second jet stream of water exits the second discharge duct member so as to provide both a vertical thrust component and a rearward thrust component.

24. The apparatus of claim 1 wherein said third discharge duct member is angularly oriented such that when the third water jet pump is activated, said third jet stream of water exits the third discharge duct member so as to provide both a vertical thrust component and a forward thrust component.

25. The apparatus of claim 1 wherein the rechargeable power source is housed in a single assembly which includes a heat sink.

26. The apparatus of claim 17 wherein said flexible one-way exhaust valve includes a top recess which retains water during pulsing of the water jet pumps during the submersion program thereby further aiding in pushing the apparatus to the bottom wall surface of the contained body of water.

27. The apparatus of claim 2 wherein said flexible one-way exhaust valve seals the terminal end portion of the first duct member such that regardless of whether the first water jet pump is on or off, air inside the apparatus can escape but air from outside the apparatus cannot enter through the exhaust valve.

28. A rechargeable autonomous robotic pool cleaning apparatus for cleaning the bottom wall surface of a contained body of water, the apparatus comprising:

a body structure having front, rear, top, bottom and side portions, a longitudinal axis and a vertical axis;

a first water jet pump housed within said body structure, said first pump including an impeller for generating a first jet stream of water when activated, said first pump being positioned adjacent to a first discharge duct member, said first discharge duct member being vertically oriented relative to the longitudinal axis of the body structure and parallel to its vertical axis for directing the first jet stream of water vertically upward relative to the body structure;

a flexible one-way exhaust valve positioned and located adjacent the terminal end portion of said first duct member;

a second water jet pump housed within said body structure, said second pump including an impeller for generating a second jet stream of water when activated, said second pump being positioned adjacent to a second discharge duct member, said second discharge duct member being angularly oriented relative to the vertical axis of the body structure for directing the second jet stream of water at an outflow angle relative to the vertical axis of the body structure and towards the front portion of the body structure;

a first baffle member associated with said second discharge duct member, said first baffle member directing the second jet stream of water at a specific angle relative to the vertical axis of the body structure as the second jet stream of water exits the second discharge duct, said first baffle member being selectively adjustable so as to alter the outflow direction of the second jet stream of water relative to the vertical axis of the body structure;

a first pivotally mounted flap valve positioned and located adjacent the terminal end portion of said second duct member, said first flap valve being selectively rotatable;

a third water jet pump housed within said body structure, said third pump including an impeller for generating a third jet stream of water when activated, said third pump being positioned adjacent to a third discharge duct member, said third discharge duct member being angularly oriented relative to the vertical axis of the body structure for directing the third jet stream of water at an outflow angle relative to the vertical axis of the body structure and towards the rear portion of the body structure;

a second baffle member associated with said third discharge duct member, said second baffle member directing the third jet stream of water at a specific angle relative to the vertical axis of the body structure as the third jet stream of water exits the third discharge duct member, said second baffle member being selectively adjustable so as to alter the outflow direction of the third jet stream of water relative to the vertical axis of the body structure;

- a second pivotally mounted flap valve positioned and located adjacent the terminal end portion of said third discharge duct member, said second flap valve being selectively rotatable;
- a removable filter assembly slidably insertable into said body structure for collecting debris from the bottom wall surface of the contained body of water, said filter assembly forming the bottom portion of said body structure;
- at least three duckbill valves associated with said filter assembly, each duckbill valve having an inlet portion adjacent the bottom portion of said body structure for receiving water from the contained body of water and each duckbill valve having an outlet portion positioned in said filter assembly, said filter assembly filtering debris from the water received by said duckbill valves as water passes through the filter assembly;
- a pair of freely rotating front wheels and a pair of freely rotating rear wheels associated with said body structure;
- a rechargeable power source housed within the body structure for providing power to said first, second and third water jet pumps;
- electronics housed within said body structure and electronically connected to the rechargeable power source and to said first, second and third water jet pumps for controlling the operating of the pumps, the electronics including at least one main controller, memory for storing at least one operating program for controlling the operation of the first, second and third pumps for moving the apparatus both vertically and horizontally in the contained body of water, and a charging controller coupled to the power source and to a charging input port for externally charging the power source;
- said first water jet pump, when activated, causing water to be drawn into said filter assembly through said at least three duckbill valves, causing water to exit the filter assembly and causing said first jet stream of water to exit through the first discharge duct member thereby providing a downward thrust force pushing the apparatus downward toward the bottom wall surface of the contained body of water;
- said second water jet pump, when activated, causing water to be drawn into the filter assembly through the at least three duckbill valves, causing water to exit the filter assembly, and causing said second jet stream of water to exit through the second discharge duct member thereby providing at least a rearward thrust component pushing the apparatus in a rearward direction;
- said third water jet pump, when activated, causing water to be drawn into the filter assembly through said at least three duckbill valves, causing water to exit the filter assembly, and causing said third jet stream of water to exit through the third discharge duct valve thereby providing at least a forward thrust component pushing the apparatus in a forward direction;
- said apparatus being buoyant so as to float at the surface of the water when said first, second and third pumps are not activated, said apparatus, when submerged, automatically returning to the surface of the water when said first, second and third pumps are not activated;
- said at least one main controller activating said at least one operating program form propelling the apparatus in both a vertical direction to descend to the bottom wall surface of the contained body of water and in a horizontal direction along the bottom wall surface and the water surface.

29. The apparatus of claim 28 including a selectively attachable nozzle member positioned and located adjacent the terminal end portion of each of said second and third discharge duct members for controlling the outflow direction of the second and third jet streams of water, said nozzle members being adjustable in both a horizontal plane and a vertical plane so as to produce any one or more of a vertical thrust component, a forward thrust component, a rearward thrust component and/or a sideward thrust component depending upon the positioning of said nozzle members relative to the vertical axis of the body structure.

30. The apparatus of claim 28 wherein said filter assembly includes a filter mesh material for retaining any debris within the filter assembly as water passes therethrough.

31. The apparatus of claim 28 including a plurality of freely rotating idler wheels located on the bottom portion of the filter assembly.

32. The apparatus of claim 28 including at least one freely rotating idler wheel positioned and located on the outer portions of the body structure.

33. The apparatus of claim 28 wherein said first, second and third pumps are positioned and located in a pump assembly, said pump assembly being selectively removable from the body structure.

34. The apparatus of claim 28 where said electronics further includes at least one current sensor coupled to said at least one main controller for monitoring the current draw associated with each of said first, second and third pumps, said at least one current sensor outputting a signal to the at least one main controller indicative of the current draw associated with any one of the respective pumps, the at least one main controller comparing a measured current draw from any one of the respective pumps to a pre-determined stored value in memory and outputting a signal to control the operation of said pumps in response thereto.

35. The apparatus of claim 28 including a display coupled to the power source for determining the charge status of the power source, said display being positioned so as to be visible from above the water surface.

36. The apparatus of claim 28 including at least one tilt sensor coupled to the at least one main controller for detecting if the apparatus is tilted in at least the forward or backward direction of motion, said at least one tilt sensor outputting a signal to the at least one main controller indicative of the tilt status of the apparatus, the at least one main controller outputting a signal to control the operation of said pumps in response to a signal indicating a tilt status.

37. The apparatus of claim 28 wherein the at least one operating program stored in memory for controlling the operation of said pumps includes a start-up program, a submersion program, a cleaning path program, and a check robot condition program, said at least one main controller being operable to execute any one or more of said programs for controlling the operation of said pumps in accordance with the selected program.

38. The apparatus of claim 37 wherein the submersion program pulses the water jet pumps to propel the apparatus downward to the bottom surface of the contained body of water thereby allowing excess air trapped in the body structure to be forced out through the flexible one-way exhaust valve and said first and second pivotally mounted flap valves during the submersion process.

39. The apparatus of claim 28 wherein the power source and the electronics are housed in a single assembly, said single assembly being selectively removable from the body structure.

40. The apparatus of claim 28 wherein said body structure includes a pair of handle members which project above the surface of the water when the apparatus is floating in the water.

41. The apparatus of claim 37 wherein the check robot condition program checks for a tilt status and an out of water status of the apparatus during the cleaning path program.

42. The apparatus of claim 37 wherein the submersion program periodically measures the current draw of all individual pumps and compares the measured current draw to a pre-determined stored value to determine if the apparatus is in or out of the contained body of water.

43. The apparatus of claim 37 wherein the check robot condition program measures the current draw associated with any one of the respective pumps and compares the measured current draw to a predetermined stored value in memory to determine if the apparatus is in or out of the contained body of water and, if the apparatus is out of the water, said check robot condition program activates the submersion program and, if the apparatus is determined to be in the body of water, said check robot condition program checks for a tilt status of the apparatus in at least the forward or rearward direction of movement and, if the apparatus is tilted, the check robot condition program activates appropriate pumps in response to the tilt status.

44. The apparatus of claim 28 including a wiper member associated with each inlet portion of each duckbill valve.

45. The apparatus of claim 28 wherein said at least three duckbill valves overlap each other.

46. The apparatus of claim 28 wherein at least one of said at least three duckbill valves is positioned adjacent the front portion of the body structure and the at least two of the at least three duckbill valves are positioned adjacent the rear portion of the body structure.

47. The apparatus of claim 38 wherein said flexible one-way exhaust valve includes a top recess which retains water during the pulsing of the water jet pumps during the submersion program thereby further aiding in pushing the apparatus to the bottom wall surface of the contained body of water.

48. The apparatus of claim 28 wherein said flexible one-way exhaust valve seals the terminal end portion of the first duct member such that regardless of whether the first water jet pump is on or off, air inside the apparatus can escape but air from outside the apparatus cannot enter through the exhaust valve.

49. The apparatus of claim 39 including a separating plate isolating the power source from the electronics, the separating plate also acting as a heat sink.

50. A method for submerging a robotic pool cleaning apparatus for cleaning the bottom surface of a contained body of water, the method comprising the steps of:

providing at least one water jet pump on the pool cleaning apparatus, the at least one water jet pump including an impeller for generating a jet stream of water when activated, said at least one water jet pump being positioned adjacent to a discharge duct member, said discharge duct member being oriented relative to the longitudinal axis of the body structure for directing the jet stream of water in an upward direction so as to provide at least a downward thrust component when the at least one water jet pump is activated;

providing a one-way flexible exhaust valve positioned adjacent the terminal end portion of the discharge duct member, the one-way valve including a top recess for retaining water;

turning on the at least one water jet pump for a predetermined period of time;

turning off the at least one water jet pump for a predetermined period of time; and pulsing the at least one water jet pump on and off for predetermined periods of time to propel the pool cleaning apparatus downward towards the bottom surface of the contained body of water, the top recess of the one-way flexible exhaust valve retaining water during the pulsing of the at least one water jet pump thereby aiding in pushing the pool cleaning apparatus to the bottom surface of the contained body of water.

* * * * *